United States Patent
Ould-Ahmed-Vall et al.

(10) Patent No.: US 9,904,548 B2
(45) Date of Patent: Feb. 27, 2018

(54) INSTRUCTION AND LOGIC TO PERFORM A CENTRIFUGE OPERATION

(71) Applicant: Intel Corporation, Santa Clara, CA (US)

(72) Inventors: Elmoustapha Ould-Ahmed-Vall, Chandler, AZ (US); Robert Valentine, Kiryat Tivon (IL); Jesus Corbal, Hillsboro, OR (US); Mark J. Charney, Lexington, MA (US)

(73) Assignee: Intel Corporation, Santa Clara, CA (US)

( * ) Notice: Subject to any disclaimer, the term of this patent is extended or adjusted under 35 U.S.C. 154(b) by 161 days.

(21) Appl. No.: 14/580,069

(22) Filed: Dec. 22, 2014

(65) Prior Publication Data

US 2016/0179539 A1 Jun. 23, 2016

(51) Int. Cl.
G06F 15/00 (2006.01)
G06F 7/38 (2006.01)
G06F 9/44 (2006.01)
G06F 9/00 (2006.01)
G06F 9/30 (2018.01)

(52) U.S. Cl.
CPC ........ *G06F 9/30145* (2013.01); *G06F 9/3013* (2013.01); *G06F 9/30018* (2013.01); *G06F 9/30032* (2013.01)

(58) Field of Classification Search
None
See application file for complete search history.

(56) References Cited

U.S. PATENT DOCUMENTS

| | | | | |
|---|---|---|---|---|
| 5,696,922 A * | 12/1997 | Fromm | ............... | G06F 15/8007 711/220 |
| 5,765,181 A * | 6/1998 | Oberlin | ............. | G06F 15/17381 711/219 |
| 5,900,023 A * | 5/1999 | Pase | ..................... | G06F 12/0284 708/654 |
| 6,119,198 A * | 9/2000 | Fromm | ............... | G06F 12/0692 711/219 |
| 6,715,066 B1 * | 3/2004 | Steele, Jr. | ............... | G06F 7/764 708/209 |
| 6,718,492 B1 * | 4/2004 | Shavit | ..................... | G06F 7/762 712/E9.019 |

(Continued)

OTHER PUBLICATIONS

Yed Idya Hilewitz et al., "Fast Bit Compression and Expansion with Parallel Extract and Parallel Deposit Instructions", Sep. 11-13, 2006, pp. 65-72.

(Continued)

*Primary Examiner* — George Giroux
(74) *Attorney, Agent, or Firm* — Nicholson De Vos Webster & Elliott LLP

(57) ABSTRACT

A processing device implements a set of instructions to perform a centrifuge operation using vector or general purpose registers. In one embodiment, the centrifuge operation separates bits in a source register to opposing regions of a destination register based on a control mask, where each source register bit with a corresponding control mask value of one is written to one region in a destination register, while source register bits with a corresponding control mask value of zero are written to an opposing region of the destination register.

20 Claims, 18 Drawing Sheets

(56) References Cited

U.S. PATENT DOCUMENTS

| | | | |
|---|---|---|---|
| 2002/0169808 A1* | 11/2002 | Fromm | G06F 7/76 708/204 |
| 2004/0054878 A1 | 3/2004 | Debes et al. | |
| 2009/0019269 A1 | 1/2009 | Wolff et al. | |
| 2011/0153997 A1 | 6/2011 | Loktykhin et al. | |
| 2014/0019714 A1 | 1/2014 | Ould-Ahmed-Vall et al. | |
| 2014/0181466 A1* | 6/2014 | Forsyth | G06F 9/30021 712/7 |
| 2014/0297991 A1 | 10/2014 | Corbal et al. | |
| 2014/0317377 A1 | 10/2014 | Ould-Ahmed-Vall et al. | |

OTHER PUBLICATIONS

PCT/US2015/060817 Notification of Transmittal of the International Search Report and the Written Opinion of the International Searching Authority, dated Mar. 4, 2016, 11 pages.

PCT/US2015/060817 Notification Concerning Transmittal of International Preliminary Report on Patentability, dated Jul. 6, 2017, 8 pages.

Office action and Search Report with English translation of Search Report from Taiwan Patent Application No. 104138151, dated Dec. 13, 2016, 18 pages.

\* cited by examiner

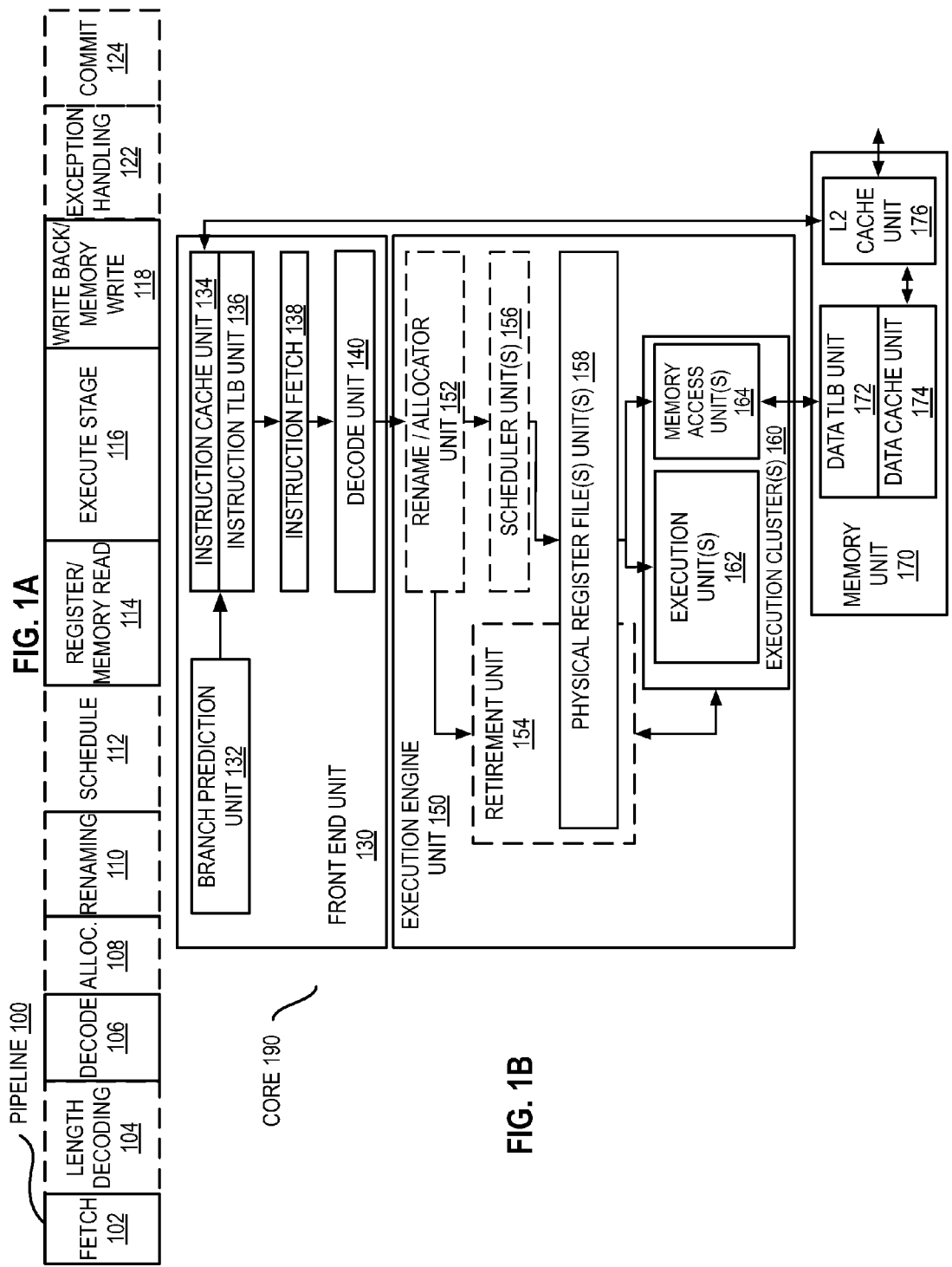

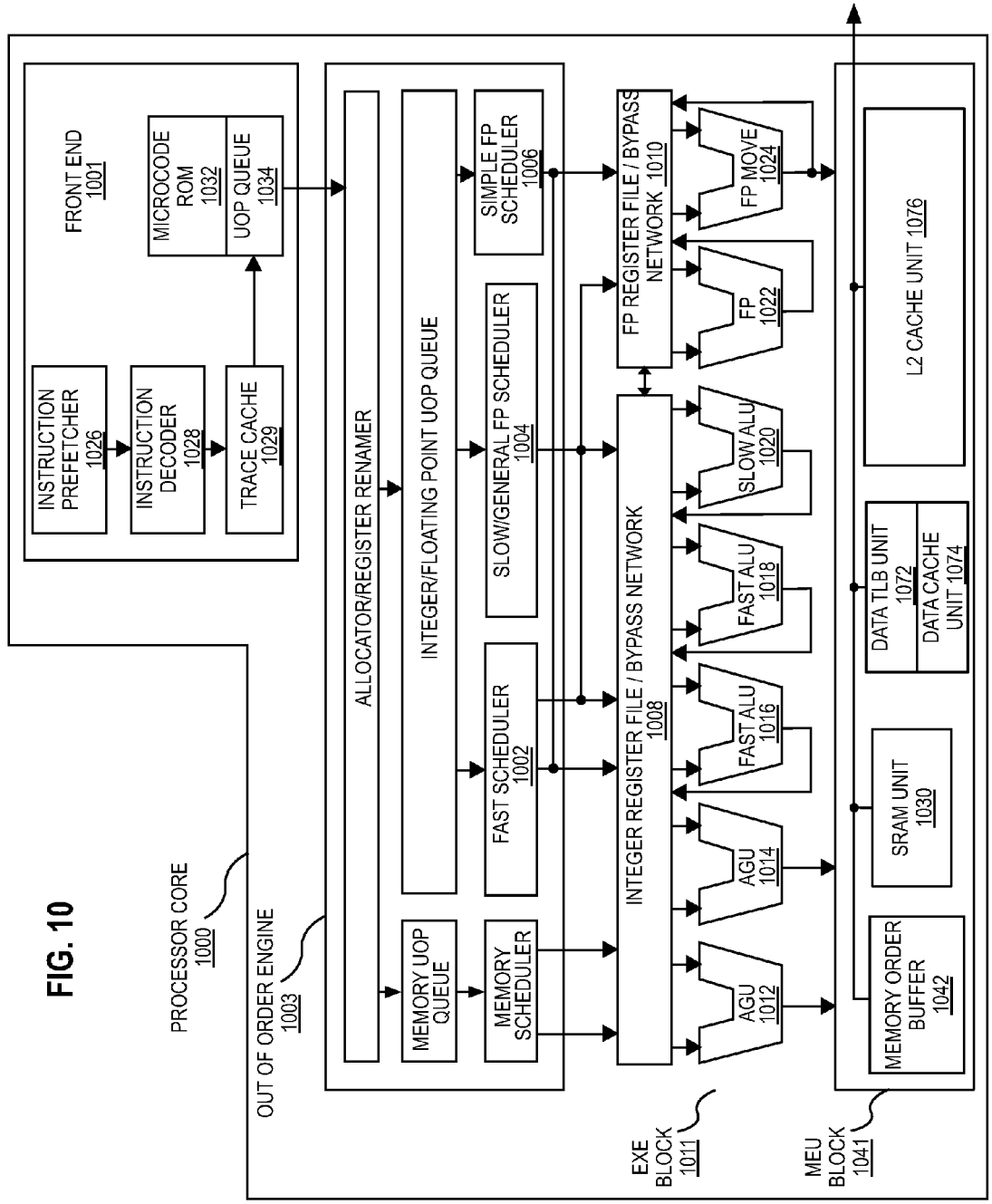

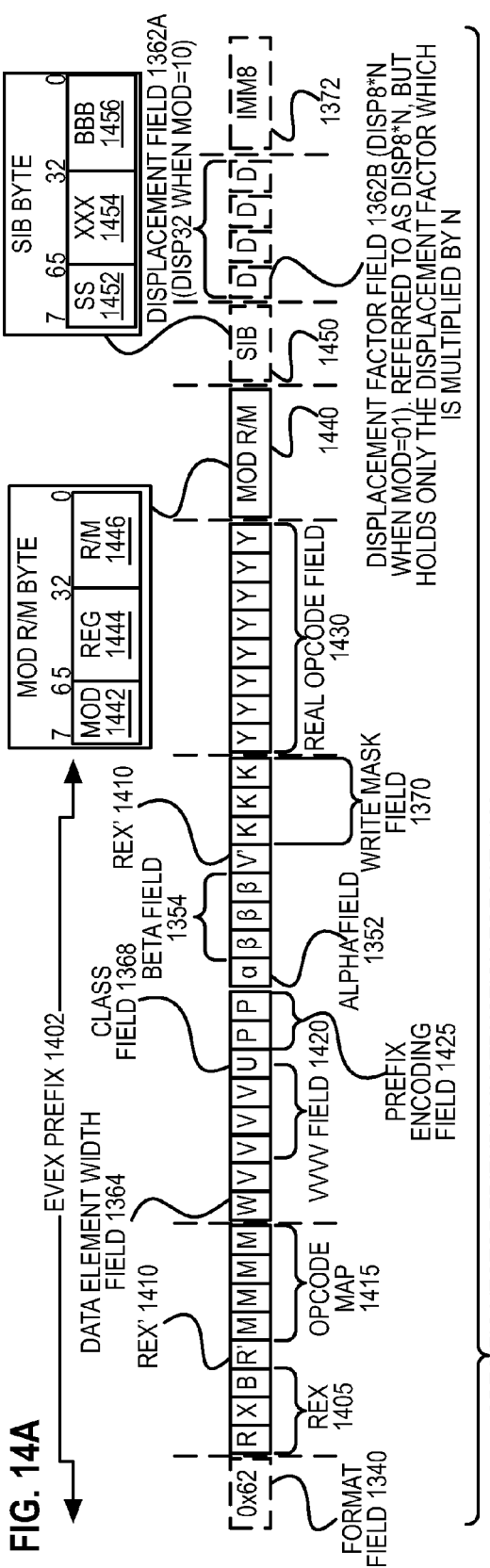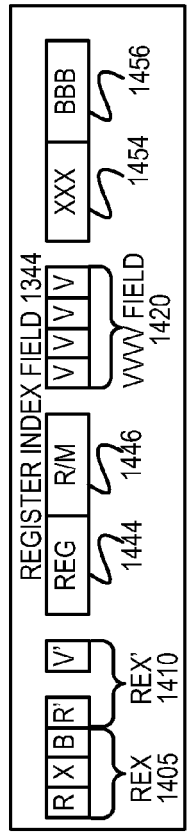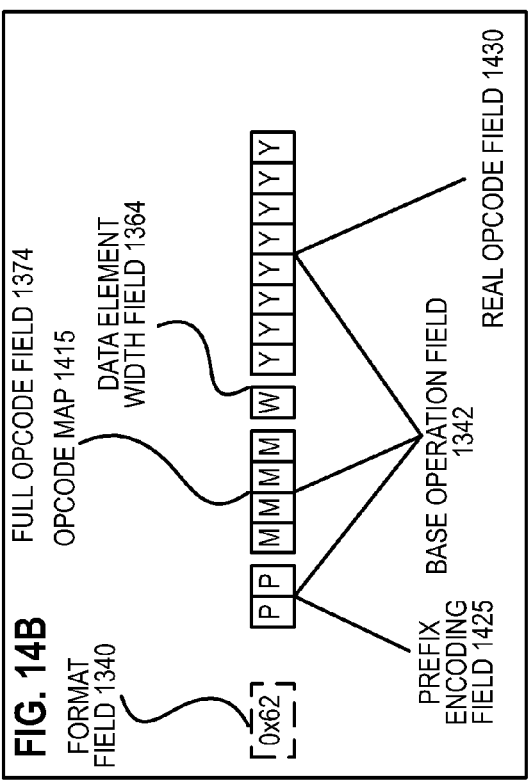

INSTRUCTION AND LOGIC TO PERFORM A CENTRIFUGE OPERATION

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Certain types of applications often require the same operation to be performed on a large number of data items (referred to as "data parallelism"). Single Instruction Multiple Data (SIMD) refers to a type of instruction that causes a processor to perform an operation on multiple data items. SIMD technology is especially suited to processors that can logically divide the bits in a register into a number of fixed-sized data elements, each of which represents a separate value. For example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as "packed" data type or a "vector" data type, and operands of this data type are referred to as packed data operands or vector operands. In other words, a packed data item or vector refers to a sequence of packed data elements, and a packed data operand or a vector operand is a source or destination operand of a SIMD instruction (also known as a packed data instruction or a vector instruction).

DESCRIPTION OF THE FIGURES

Embodiments are illustrated by way of example and not limitation in the Figures of the accompanying drawings, in which:

FIG. 1A is a block diagram illustrating both an exemplary in-order fetch, decode, retire pipeline and an exemplary register renaming, out-of-order issue/execution pipeline according to embodiments;

FIG. 1B is a block diagram illustrating both an exemplary embodiment of an in-order fetch, decode, retire core and an exemplary register renaming, out-of-order issue/execution architecture core to be included in a processor according to embodiments;

FIG. 10 is a block diagram of a processor core including in accordance with embodiments described herein;

FIGS. 14A-D are block diagrams illustrating an exemplary specific vector friendly instruction format according to embodiments of the invention.

DETAILED DESCRIPTION

Figure 2A:
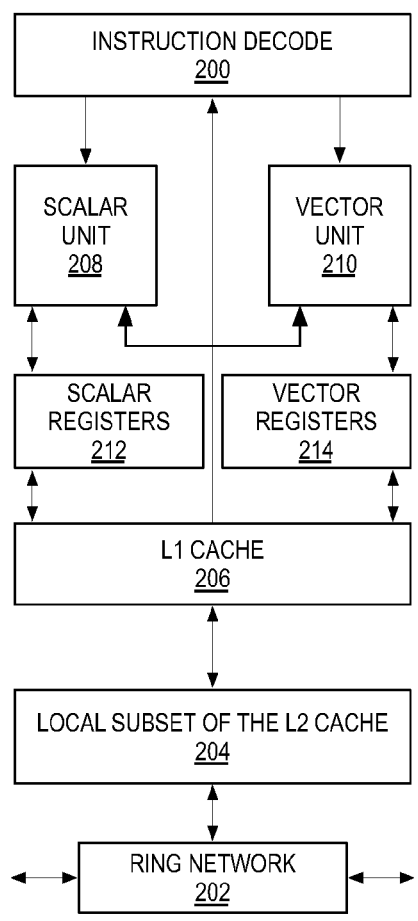
FIG. 2A-B are block diagrams of a more specific exemplary in-order core architecture

The SIMD technology, such as that employed by the Intel® Core™ processors having an instruction set including x86, MMX™, Streaming SIMD Extensions (SSE), SSE2, SSE3, SSE4.1, and SSE4.2 instructions, has enabled a significant improvement in application performance. An additional set of SIMD extensions, referred to the Advanced Vector Extensions (AVX) (AVX1 and AVX2) and using the Vector Extensions (VEX) coding scheme, has been released (see, e.g., see Intel® 64 and IA-32 Architectures Software Developers Manual, September 2014; and see Intel® Architecture Instruction Set Extensions Programming Reference, September 2014). Architectural extensions are described which extend the Intel Architecture (IA). However, the underlying principles are not limited to any particular ISA.

In one embodiment, a processing device implements a set of instructions to perform a centrifuge operation using vector or general purpose registers. In the centrifuge operation, also referred to as 'sheep and goats,' bits under a mask bit of 1 are separated on one side (e.g., right side) and bits under 0 are put one the other side (e.g., left side) of the destination element. The instructions use a control mask to determine which side of the destination register to write a source bit. The centrifuge instructions may be used to implement basic functionality that is a component of many bit-manipulation routines.

Described below are processor core architectures followed by descriptions of exemplary processors and computer architectures according to embodiments described herein. Numerous specific details are set forth in order to provide a thorough understanding of the embodiments of the invention described below. It will be apparent, however, to one skilled in the art that the embodiments may be practiced without some of these specific details. In other instances, well-known structures and devices are shown in block diagram form to avoid obscuring the underlying principles of the various embodiments.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Processors may be implemented using a single processor core or can include a multiple processor cores. The processor cores within the processor may be homogenous or heterogeneous in terms of architecture instruction set.

Implementations of different processors include: 1) a central processor including one or more general purpose in-order cores for general-purpose computing and/or one or more general purpose out-of-order cores intended for general-purpose computing; and 2) a coprocessor including one or more special purpose cores intended primarily for graphics and/or scientific (e.g., many integrated core processors). Such different processors lead to different computer system architectures including: 1) the coprocessor on a separate chip from the central system processor; 2) the coprocessor on a separate die, but in the same package as the central system processor; 3) the coprocessor on the same die as other processor cores (in which case, such a coprocessor is sometimes referred to as special purpose logic, such as integrated graphics and/or scientific (throughput) logic, or as special purpose cores); and 4) a system on a chip that may include on the same die the described processor (sometimes referred to as the application core(s) or application processor(s)), the above described coprocessor, and additional functionality.

Exemplary Core Architectures

In-Order and Out-of-Order Core Block Diagram

FIG. 1A is a block diagram illustrating an exemplary in-order pipeline and an exemplary register renaming out-of-order issue/execution pipeline, according to an embodiment. FIG. 1B is a block diagram illustrating both an exemplary embodiment of an in-order architecture core and an exemplary register renaming, out-of-order issue/execution architecture core to be included in a processor according to an embodiment. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general-purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM® instruction set (with optional additional extensions such as NEON) of ARM Holdings of Cambridge, England), including the instruction(s) described herein. In one embodiment, the core 190 includes logic to support a packed data instruction set extension (e.g., AVX1, AVX2, etc.), allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyper-Threading Technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 2B:
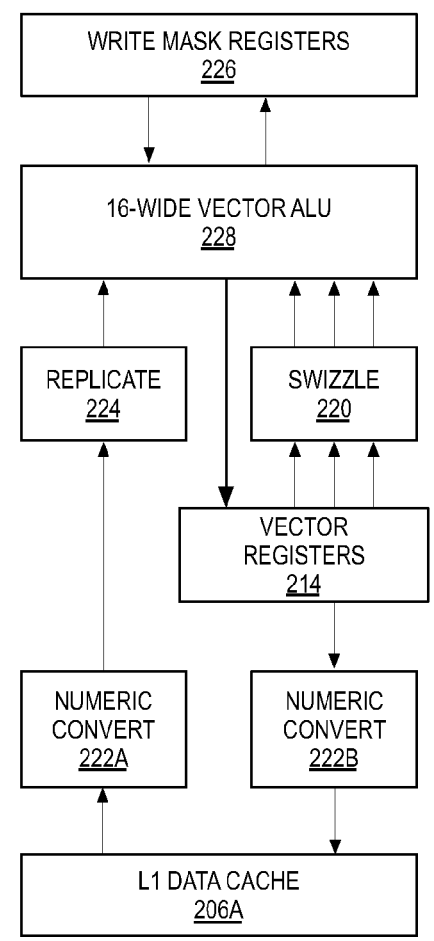

FIGS. 2A-B are block diagrams of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 2A is a block diagram of a single processor core, along with its connection to the on-die interconnect network 202 and with its local subset of the Level 2 (L2) cache 204, according to an embodiment. In one embodiment, an instruction decoder 200 supports the x86 instruction set with a packed data instruction set extension. An L1 cache 206 allows low-latency accesses to cache memory into the scalar and vector units. While in one embodiment (to simplify the design), a scalar unit 208 and a vector unit 210 use separate register sets (respectively, scalar registers 212 and vector registers 214) and data transferred between them is written to memory and then read back in from a level 1 (L1) cache 206, alternative embodiments may use a different approach (e.g., use a single register set or include a communication path that allow data to be transferred between the two register files without being written and read back).

The local subset of the L2 cache 204 is part of a global L2 cache that is divided into separate local subsets, one per processor core. Each processor core has a direct access path to its own local subset of the L2 cache 204. Data read by a processor core is stored in its L2 cache subset 204 and can be accessed quickly and in parallel with other processor cores accessing their own local L2 cache subsets. Data written by a processor core is stored in its own L2 cache subset 204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 2B is an expanded view of part of the processor core in FIG. 2A according to an embodiment. FIG. 2B includes an L1 data cache 206A part of the L1 cache 204, as well as more detail regarding the vector unit 210 and the vector registers 214. Specifically, the vector unit 210 is a 16-wide vector-processing unit (VPU) (see the 16-wide ALU 228), which executes one or more of integer, single-precision float, and double precision float instructions. The VPU supports swizzling the register inputs with swizzle unit 220, numeric conversion with numeric convert units 222A-B, and replication with replication unit 224 on the memory input. Write mask registers 226 allow predicating resulting vector writes.

Processor with Integrated Memory Controller and Special Purpose Logic

Figure 3:
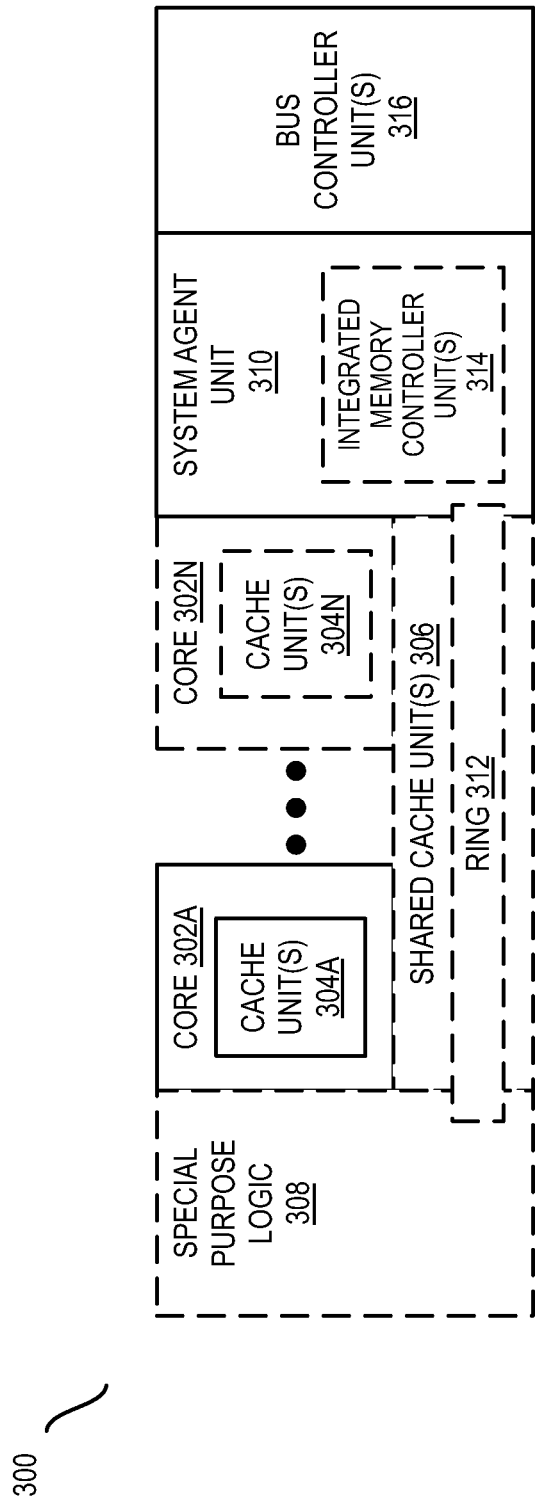
FIG. 3 is a block diagram of a single core processor and a multicore processor with integrated memory controller and special purpose logic.

FIG. 3 is a block diagram of a processor 300 that may have more than one core, may have an integrated memory controller, and may have integrated graphics according to an embodiment. The solid lined boxes in FIG. 3 illustrate a processor 300 with a single core 302A, a system agent 310, a set of one or more bus controller units 316, while the optional addition of the dashed lined boxes illustrates an alternative processor 300 with multiple cores 302A-N, a set of one or more integrated memory controller unit(s) 314 in the system agent unit 310, and special purpose logic 308.

Thus, different implementations of the processor 300 may include: 1) a CPU with the special purpose logic 308 being integrated graphics and/or scientific (throughput) logic (which may include one or more cores), and the cores 302A-N being one or more general purpose cores (e.g., general purpose in-order cores, general purpose out-of-order cores, a combination of the two); 2) a coprocessor with the cores 302A-N being a large number of special purpose cores intended primarily for graphics and/or scientific (throughput); and 3) a coprocessor with the cores 302A-N being a large number of general purpose in-order cores. Thus, the processor 300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 306, and external memory (not shown) coupled to the set of integrated memory controller units 314. The set of shared cache units 306 may include one or more mid-level caches, such as level 2 (L2), level 3 (L3), level 4 (L4), or other levels of cache, a last level cache (LLC), and/or combinations thereof. While in one embodiment a ring based interconnect unit 312 interconnects the integrated graphics logic 308, the set of shared cache units 306, and the system agent unit 310/integrated memory controller unit(s) 314, alternative embodiments may use any number of well-known techniques for interconnecting such units. In one embodiment, coherency is maintained between one or more cache units 306 and cores 302-A-N.

In some embodiments, one or more of the cores 302A-N are capable of multi-threading. The system agent 310 includes those components coordinating and operating cores 302A-N. The system agent unit 310 may include for example a power control unit (PCU) and a display unit. The PCU may be or include logic and components needed for regulating the power state of the cores 302A-N and the integrated graphics logic 308. The display unit is for driving one or more externally connected displays.

The cores 302A-N may be homogenous or heterogeneous in terms of architecture instruction set; that is, two or more of the cores 302A-N may be capable of execution the same instruction set, while others may be capable of executing only a subset of that instruction set or a different instruction set.

Exemplary Computer Architectures

FIGS. 4-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
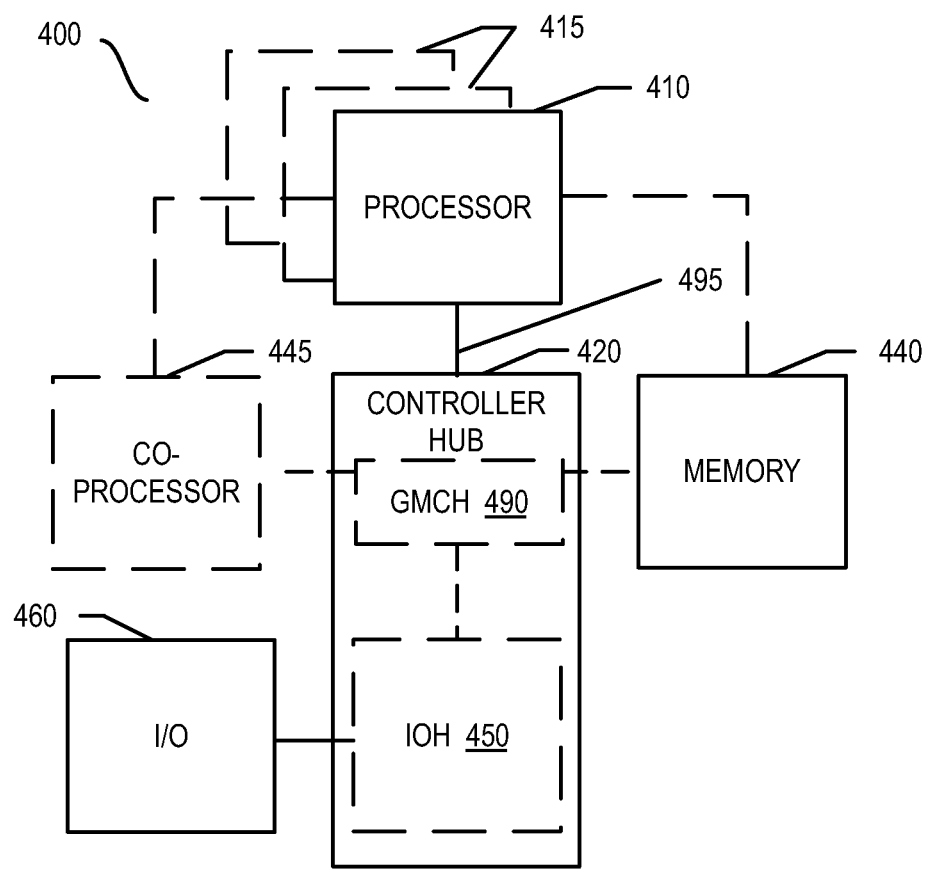
FIG. 4 illustrates a block diagram of a system in accordance with an embodiment.

FIG. 4 shows a block diagram of a system 400 in accordance with an embodiment. The system 400 may include one or more processors 410, 415, which are coupled to a controller hub 420. In one embodiment the controller hub 420 includes a graphics memory controller hub (GMCH) 490 and an Input/Output Hub (IOH) 450 (which may be on separate chips); the GMCH 490 includes memory and graphics controllers to which are coupled memory 440 and a coprocessor 445; the IOH 450 is couples input/output (I/O) devices 460 to the GMCH 490. Alternatively, one or both of the memory and graphics controllers are integrated within the processor (as described herein), the memory 440 and the coprocessor 445 are coupled directly to the processor 410, and the controller hub 420 in a single chip with the IOH 450.

The optional nature of additional processors 415 is denoted in FIG. 4 with broken lines. Each processor 410, 415 may include one or more of the processing cores described herein and may be some version of the processor 300.

The memory 440 may be, for example, dynamic random access memory (DRAM), phase change memory (PCM), or a combination of the two. For at least one embodiment, the controller hub 420 communicates with the processor(s) 410, 415 via a multi-drop bus, such as a frontside bus (FSB), point-to-point interface such as QuickPath Interconnect (QPI), or similar connection 495.

In one embodiment, the coprocessor 445 is a special-purpose processor, such as, for example, a high-throughput MIC processor, a network or communication processor, compression engine, graphics processor, GPGPU, embedded processor, or the like. In one embodiment, controller hub 420 may include an integrated graphics accelerator.

There can be a variety of differences between the physical resources 410, 415 in terms of a spectrum of metrics of merit including architectural, microarchitectural, thermal, power consumption characteristics, and the like.

In one embodiment, the processor 410 executes instructions that control data processing operations of a general type. Embedded within the instructions may be coprocessor instructions. The processor 410 recognizes these coprocessor instructions as being of a type that should be executed by the attached coprocessor 445. Accordingly, the processor 410 issues these coprocessor instructions (or control signals representing coprocessor instructions) on a coprocessor bus or other interconnect, to coprocessor 445. Coprocessor(s) 445 accept and execute the received coprocessor instructions.

Figure 5:
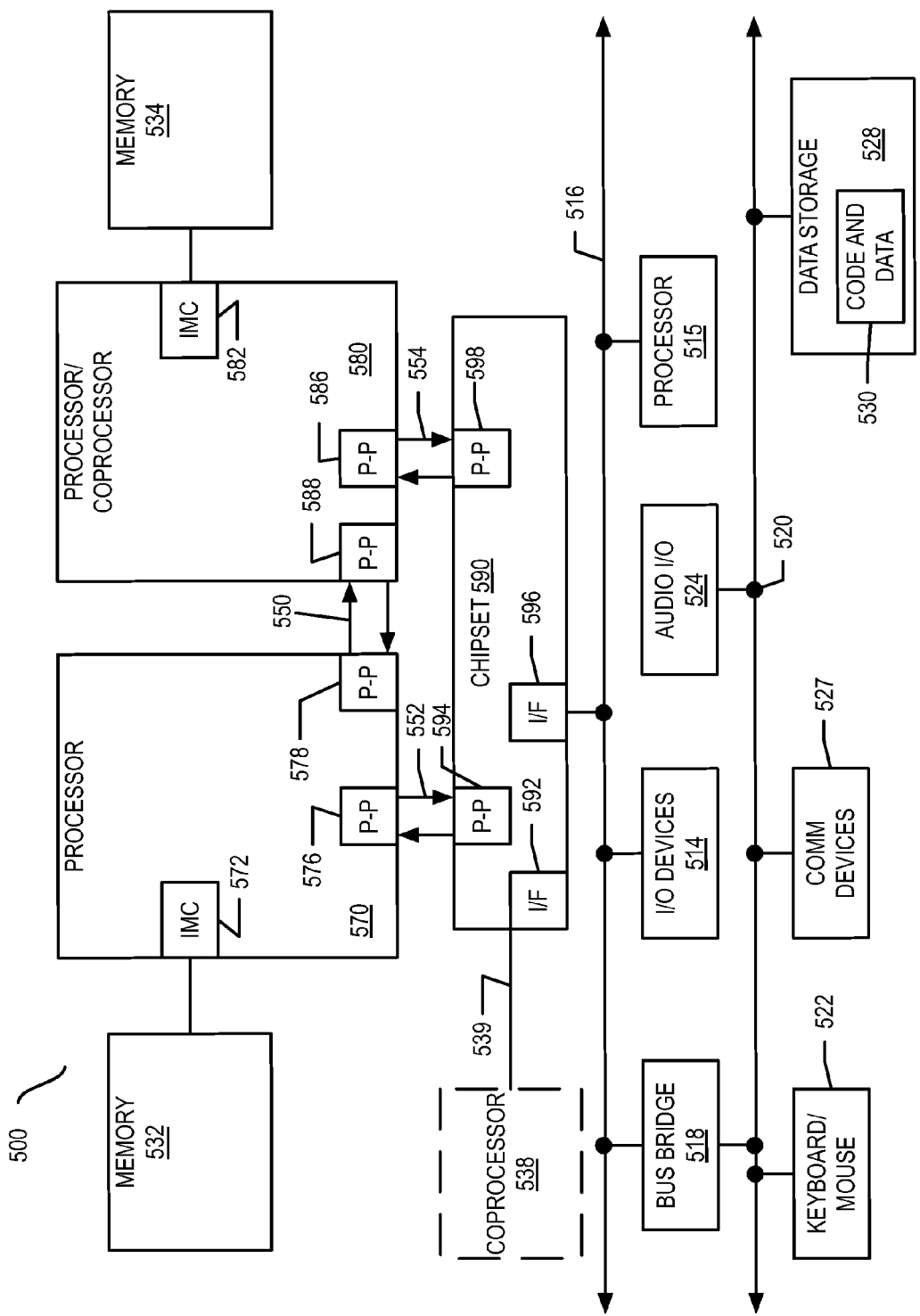
FIG. 5 illustrates a block diagram of a second system in accordance with an embodiment.

FIG. 5 shows a block diagram of a first more specific exemplary system 500 in accordance with an embodiment. As shown in FIG. 5, multiprocessor system 500 is a point-to-point interconnect system, and includes a first processor 570 and a second processor 580 coupled via a point-to-point interconnect 550. Each of processors 570 and 580 may be some version of the processor 300. In one embodiment of the invention, processors 570 and 580 are respectively processors 410 and 415, while coprocessor 538 is coprocessor 445. In another embodiment, processors 570 and 580 are respectively processor 410 coprocessor 445.

Processors 570 and 580 are shown including integrated memory controller (IMC) units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may optionally exchange information with the coprocessor 538 via a high-performance interface 539. In one embodiment, the coprocessor 538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present invention is not so limited.

As shown in FIG. 5, various I/O devices 514 may be coupled to first bus 516, along with a bus bridge 518 that couples first bus 516 to a second bus 520. In one embodiment, one or more additional processor(s) 515, such as coprocessors, high-throughput MIC processors, GPGPU's, accelerators (such as, e.g., graphics accelerators or digital signal processing (DSP) units), field programmable gate arrays, or any other processor, are coupled to first bus 516. In one embodiment, second bus 520 may be a low pin count (LPC) bus. Various devices may be coupled to a second bus 520 including, for example, a keyboard and/or mouse 522, communication devices 527 and a storage unit 528 such as a disk drive or other mass storage device that may include instructions/code and data 530, in one embodiment. Further, an audio I/O 524 may be coupled to the second bus 520. Note that other architectures are possible. For example, instead of the point-to-point architecture of FIG. 5, a system may implement a multi-drop bus or other such architecture.

Figure 6:
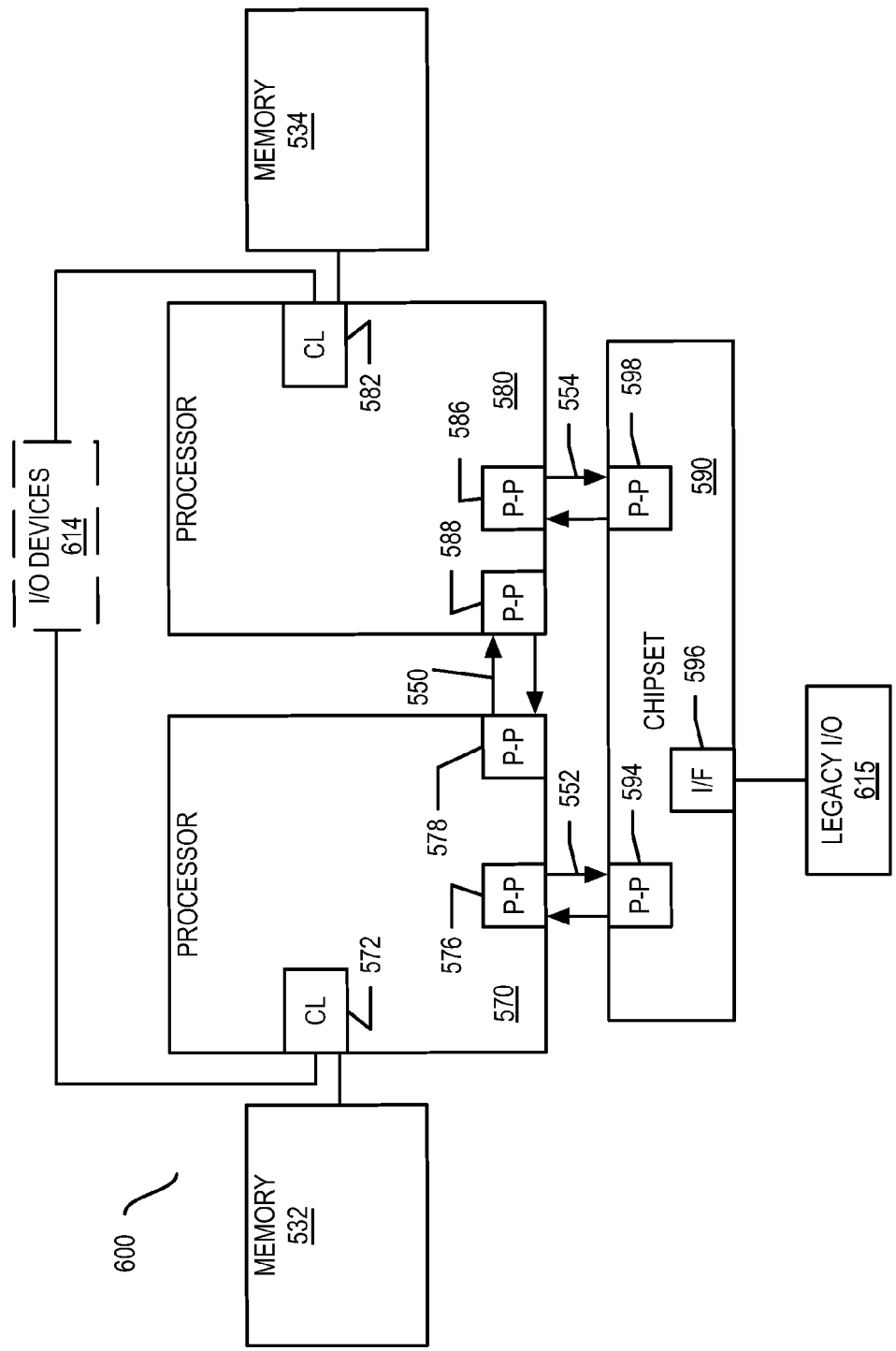
FIG. 6 illustrates a block diagram of a third system in accordance with an embodiment.

FIG. 6 shows a block diagram of a second more specific exemplary system 600 in accordance with an embodiment. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 570, 580 may include integrated memory and I/O control logic ("CL") 572 and 582, respectively. Thus, the CL 572, 582 include integrated memory controller units and include I/O control logic. FIG. 6 illustrates that not only are the memories 532, 534 coupled to the CL 572, 582, but also that I/O devices 614 are also coupled to the control logic 572, 582. Legacy I/O devices 615 are coupled to the chipset 590.

Figure 7:
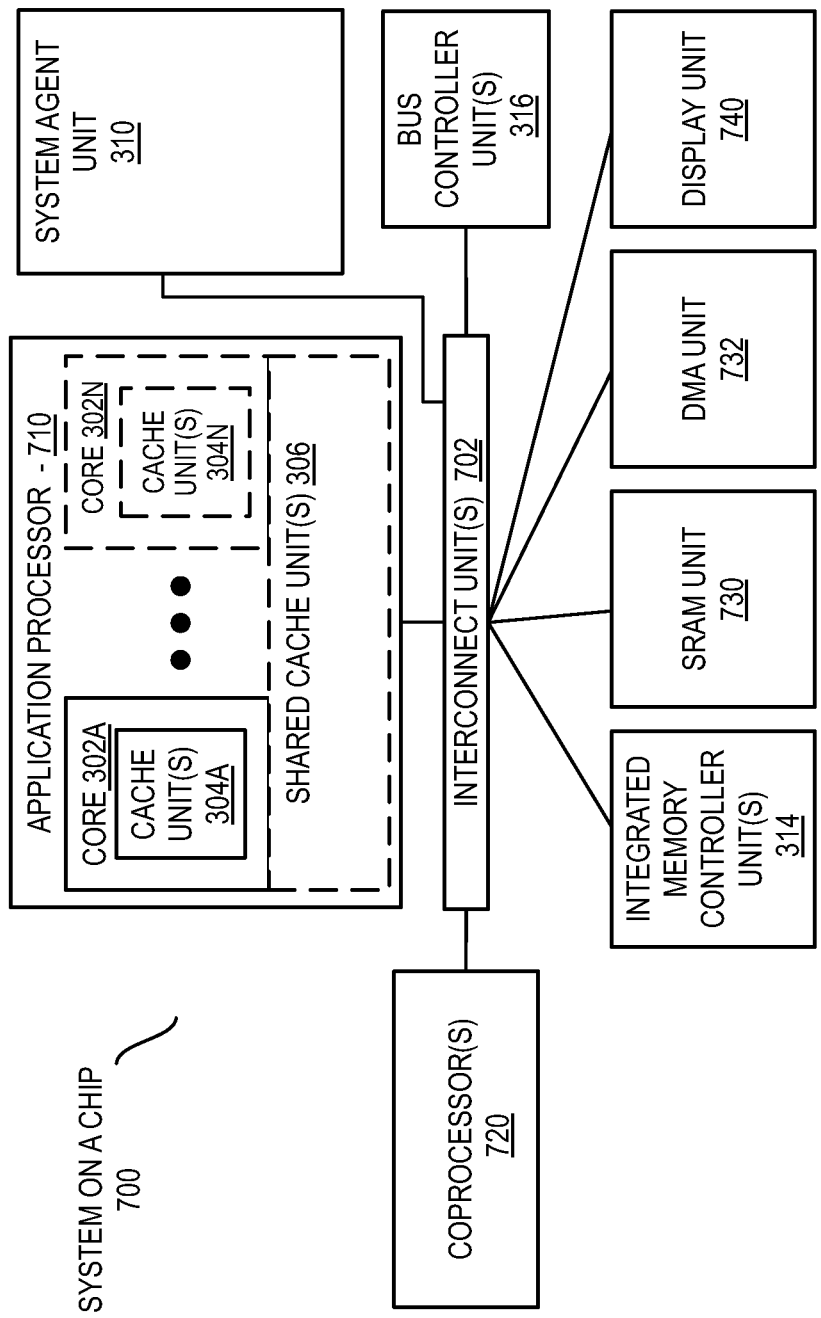
FIG. 7 illustrates a block diagram of a system on a chip (SoC) in accordance with an embodiment.

FIG. 7 shows a block diagram of a SoC 700 in accordance with an embodiment. Similar elements in FIG. 3 bear like reference numerals. Also, dashed lined boxes are optional features on more advanced SoCs. In FIG. 7, an interconnect unit(s) 702 is coupled to: an application processor 710 which includes a set of one or more cores 202A-N and shared cache unit(s) 306; a system agent unit 310; a bus controller unit(s) 316; an integrated memory controller unit(s) 314; a set or one or more coprocessors 720 which may include integrated graphics logic, an image processor, an audio processor, and a video processor; an static random access memory (SRAM) unit 730; a direct memory access (DMA) unit 732; and a display unit 740 for coupling to one or more external displays. In one embodiment, the coprocessor(s) 720 include a special-purpose processor, such as, for example, a network or communication processor, compression engine, GPGPU, a high-throughput MIC processor, embedded processor, or the like.

Embodiments of the mechanisms disclosed herein are implemented in hardware, software, firmware, or a combination of such implementation approaches. Embodiments are implemented as computer programs or program code executing on programmable systems comprising at least one processor, a storage system (including volatile and non-volatile memory and/or storage elements), at least one input device, and at least one output device.

Program code, such as code 530 illustrated in FIG. 5, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor. For example, IP cores, such as processors developed by ARM Holdings, Ltd. and the Institute of Computing Technology (ICT) of the Chinese Academy of Sciences may be licensed or sold to various customers or licensees and implemented in processors produced by these customers or licensees.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), rewritable compact disks (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 8:
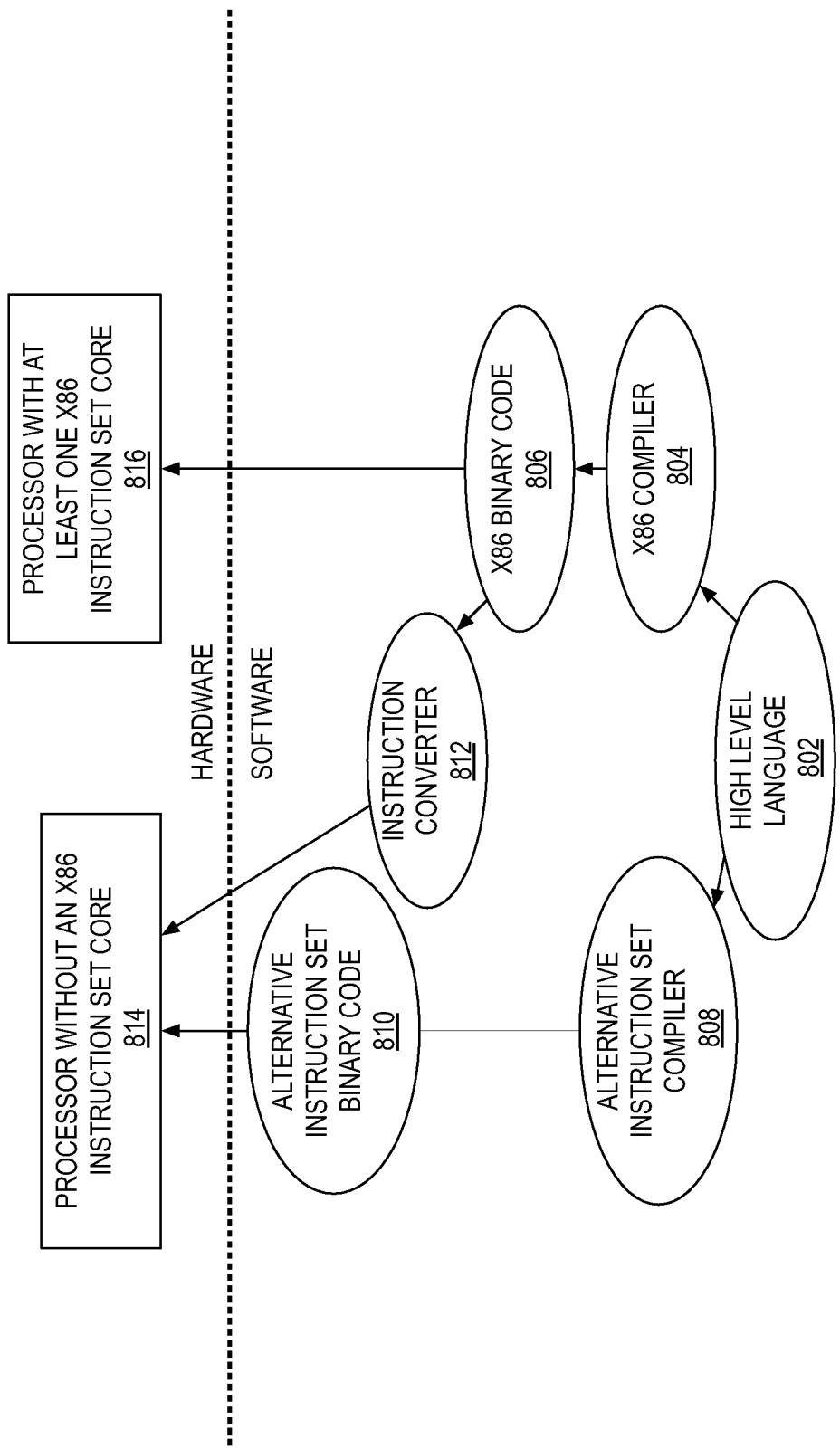
FIG. 8 illustrates a block diagram contrasting the use of a software instruction converter to convert binary instructions in a source instruction set to binary instructions in a target instruction set according to embodiments.

FIG. 8 is a block diagram contrasting the use of a software instruction converter to convert binary instructions in a source instruction set to binary instructions in a target instruction set according to an embodiment. In the illustrated embodiment, the instruction converter is a software instruction converter, although alternatively the instruction converter may be implemented in software, firmware, hardware, or various combinations thereof. FIG. 8 shows a program in a high level language 802 may be compiled using an x86 compiler 804 to generate x86 binary code 806 that may be natively executed by a processor with at least one x86 instruction set core 816.

The processor with at least one x86 instruction set core 816 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 804 represents a compiler that is operable to generate x86 binary code 806 (e.g., object code) that can, with or without additional linkage processing, be executed on the processor with at least one x86 instruction set core 816. Similarly, FIG. 8 shows the program in the high level language 802 may be compiled using an alternative instruction set compiler 808 to generate alternative instruction set binary code 810 that may be natively executed by a processor without at least one x86 instruction set core 814 (e.g., a processor with cores that execute the MIPS instruction set of MIPS Technologies of Sunnyvale, Calif. and/or that execute the ARM instruction set of ARM Holdings of Cambridge, England).

The instruction converter 812 is used to convert the x86 binary code 806 into code that may be natively executed by the processor without an x86 instruction set core 814. This converted code is not likely to be the same as the alternative instruction set binary code 810 because an instruction converter capable of this is difficult to make; however, the converted code will accomplish the general operation and be made up of instructions from the alternative instruction set. Thus, the instruction converter 812 represents software, firmware, hardware, or a combination thereof that, through emulation, simulation or any other process, allows a processor or other electronic device that does not have an x86 instruction set processor or core to execute the x86 binary code 806.

Centrifuge Instruction

Centrifuge Operation

Embodiments described herein implement a bitwise centrifuge operation. The centrifuge operation, also referred to as 'sheep and goats,' separates bits from a source register to one side or the other of a destination register based on bits in a control mask. In one embodiment, source bits associated with a control mask bit of one are separated to the right (e.g., low order) side of the destination register, while bits associated with a control mask bit of zero are separated to the left (e.g., high order) side of the destination register. General purpose or vector registers may be used as source or destination registers. In one embodiment, general-purpose registers including 32-bit or 64-bit registers are supported. In one embodiment, vector registers including 128-bit, 256-bit, or 512-bits are supported, with the vector registers having support for packed byte, word, double word, or quad word data elements.

Performing a centrifuge using instructions from existing instruction sets requires a sequence of multiple instructions. Embodiments described herein implement centrifuge functionality in a single instruction. In one embodiment a centrifuge instruction as described herein includes a first source operand indicating a mask value. Each bit of the mask with a value of one indicates that a corresponding bit for in the source register is to be separated to the 'right' side of a source register. Mask bits with value of zero are to be separated to the 'left' side of the source register. In one embodiment the source register is indicated by a second source operand.

Exemplary source and destination register values for a centrifuge instruction are shown in Table 1 below.

TABLE 1

| Centrifuge Instruction | |
| --- | --- |
| Bit | FEDCBA9876543210 |
| SRC1 | 1010001110101110 |
| SRC2 | ponmlkjihgfedcba |
| DEST | omlkgeapnjihfdcb |

In Table 1 above, the SRC1 operand indicates mask register storing a bitmask value. The SRC2 operand indicates a register storing a source value for the centrifuge operation. The letters used to illustrate the SRC2 value are shown not to indicate a particular value, but to indicate a particular bit position within a bit field. The DEST operand indicates a destination register to store the output of the centrifuge instruction. While an exemplary 16 bits are shown in Table 1, in various embodiments the instruction accept 32-bit or 64-bit general-purpose register operands. In one embodiment, vector instructions are implemented to act upon vector registers having packed byte, word, double word, or quad word data elements. In one embodiment the registers include 128-bit, 256-bit, and 512-bit registers.

To illustrate the operation of an exemplary instruction, Table 2 below shows an exemplary sequence of multiple Intel Architecture (IA) instructions that may be used to perform a centrifuge operation on set of registers. The exemplary instructions include a population count instruction, a parallel extract instruction, and a shift instruction. In one embodiment, vector instructions may also be used to perform in parallel across multiple vector data elements.

TABLE 2

| Centrifuge Operation | |
| --- | --- |
| 01 | popcnt rsi, rbx |
| 02 | pext rcx, rax, rbx |
| 03 | not rbx |
| 04 | pext rdx, rax, rbx |
| 05 | shlx rdx, rdx, rsi |
| 06 | or rcx, rdx |

In the exemplary centrifuge logic shown in Table 2 above, the 'popcnt' symbol indicates a population count instruction. The population count instruction computes the Hamming weight of an input bit field (e.g., the hamming distance of the bit field from a zero bit field of equal length). This instruction is used on the bitmask to determine the number of bits that are set. In one embodiment, the number of bits that are set in the bit field determines the divider between the 'right' and the 'left' side of the register. The 'pext' symbol indicates a parallel extract instruction. In one embodiment the parallel extract instruction extracts a single field of bits from arbitrary positions in a source register and right justifies the bits into a destination register. The 'shlx' symbol indicates a logical shift left instruction, which shifts a source bit field right by a specified number of bit positions.

The exemplary 'not' and 'or' instructions shown each perform the logical operations for which the instructions are named. The 'not' instruction computes the logical complement of the value in the input (e.g., each one bit becomes a zero bit). The 'or' instruction computes a logical or of the values in the registers indicated by the source operands. The logical operations to compute the DEST value of Table 1 from the SRC1 and SRC2 values are illustrated in FIGS. 9A-E using the exemplary logic of Table 2.

Figure 9A:
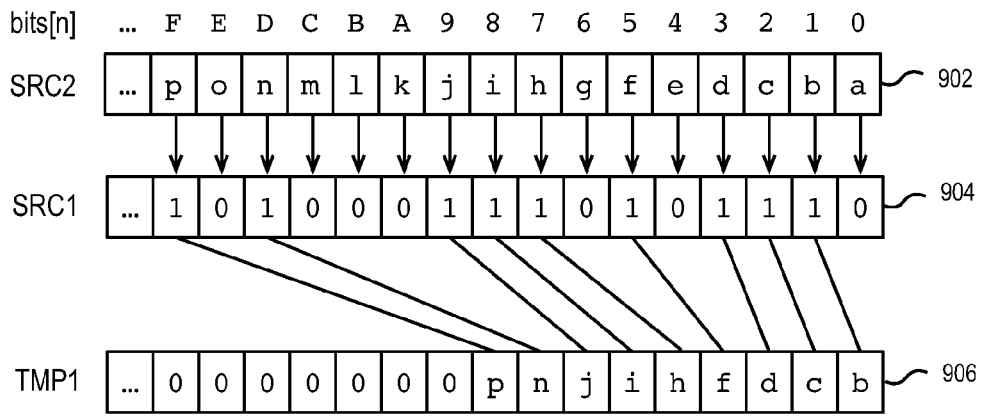
FIG. 9A-E are a block diagrams illustrating bit manipulation operations to perform a centrifuge operation, according to an embodiment

FIG. 9A-E are a block diagrams illustrating bit manipulation operations to perform a centrifuge operation, according to an embodiment. As illustrated in FIG. 9A, a parallel extract operation, also shown at line (2) of Table 2, extracts bits from SRC2 902 to a temporary register (e.g., TMP1 906) based on the control mask bits provided in SRC1 904.

Figure 9B:
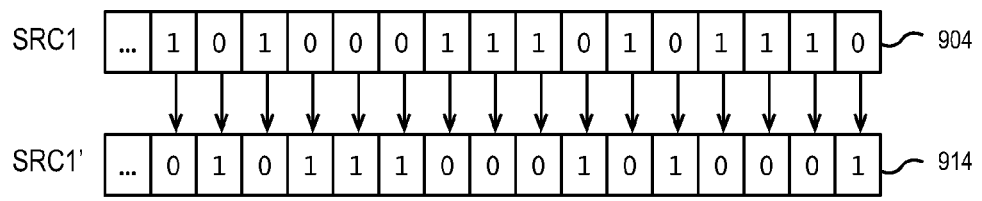

As illustrated in FIG. 9B, a not operation, also shown at line (3) of Table 2, negates bits from SRC1 904 to create a negative control mask (e.g., SRC1' 914).

Figure 9C:
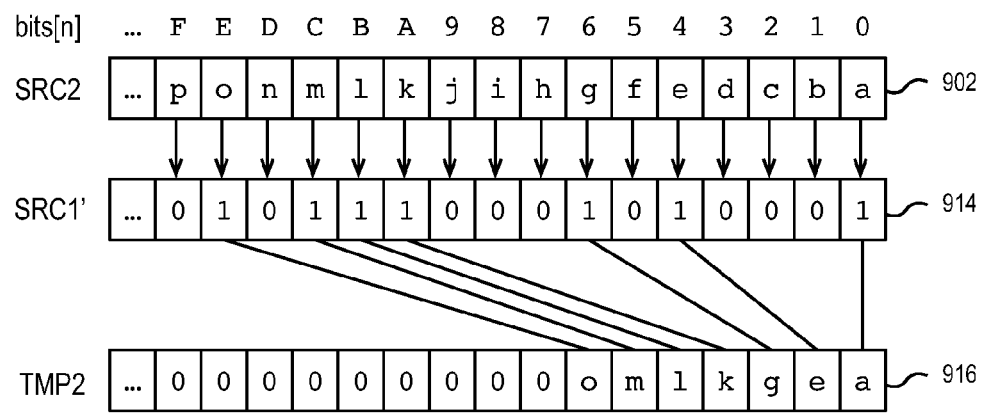

As illustrated in FIG. 9C, a second parallel extract operation, also shown at line (4) of Table 2, extracts bits from SRC2 902 to a second temporary register (e.g., TMP2 916) based on the bits provided in SRC1' 914.

Figure 9D:
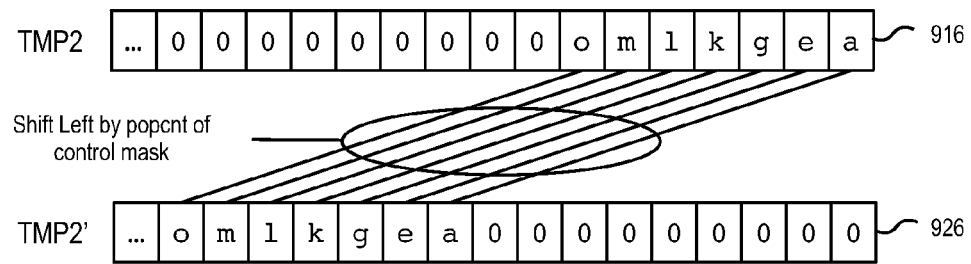

As illustrated in FIG. 9D, a shift left operation, also shown at line (5) of Table 2, shifts bits from TMP2 916 to a created a shifted temporary register (e.g., TMP2' 926). The number of positions to shift TMP2 902 is determined by the population count instruction shown at line (1) of Table 2.

Figure 9E:
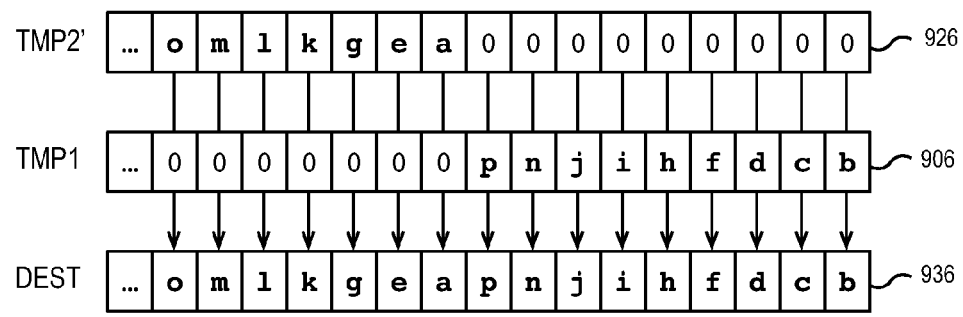

As illustrated in FIG. 9E, an 'or' operation, also shown at line (6) of Table 2, combines bits from TMP2' 926 and TMP1 906 to a destination register (e.g., DEST 936). According to embodiments, the destination register contains the result of the centrifuge operation.

Exemplary Processor Implementation

FIG. 10 is a block diagram of a processor core 1000 including logic to perform operations in accordance with embodiments described herein. In one embodiment the in-order front end 1001 is the part of the processor core 1000 that fetches instructions to be executed and prepares them to be used later in the processor pipeline. In one embodiment, the front end 1001 is similar to the front end unit 130 of FIG. 1, additionally including components including an instruction prefetcher 1026 to preemptively fetch instructions from memory. Fetched instructions may be fed to an instruction decoder 1028 to decode or interprets the instructions.

In one embodiment, the instruction decoder 1028 decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1029 takes decoded uops and assembles them into program ordered sequences or traces in the uop queue 1034 for execution.

In one embodiment the processor core 1000 implements a complex instruction set. When the trace cache 1029 encounters a complex instruction, a microcode ROM 1032 provides the uops needed to complete the operation. Some instructions are converted into a single micro-op, whereas others need several micro-ops to complete the full operation. In one embodiment, an instruction can be decoded into a small number of micro ops for processing at the instruction decoder 1028. In another embodiment, an instruction can be stored within the microcode ROM 1032 should a number of micro-ops be needed to accomplish the operation. For example, in one embodiment if more than four micro-ops are needed to complete an instruction, the decoder 1028 accesses the microcode ROM 1032 to perform the instruction.

The trace cache 1029 refers to an entry point programmable logic array (PLA) to determine a correct microinstruction pointer for reading the micro-code sequences to complete one or more instructions in accordance with one embodiment from the micro-code ROM 1032. After the microcode ROM 1032 finishes sequencing micro-ops for an instruction, the front end 1001 of the machine resumes fetching micro-ops from the trace cache 1029. In one embodiment, the processor core 1000 includes an out-of-order execution engine 1003 where instructions are prepared for execution. The out-of-order execution logic has a number of buffers to re-order instruction flow to optimize performance as the instructions proceed through the instruction pipeline. For embodiments configured for microcode support, allocator logic allocates the machine buffers and resources that each uop uses during execution. Additionally, register-renaming logic renames logical registers to physical registers in the physical registers in a register file.

In one embodiment the allocator allocates an entry for each uop in one of the two uop queues, one for memory operations and one for non-memory operations, in front of the instruction schedulers: memory scheduler, fast scheduler 1002, slow/general floating point scheduler 1004, and simple floating point scheduler 1006. The uop schedulers 1002, 1004, 1006, determine when a uop is ready to execute based on the readiness of their dependent input register operand sources and the availability of the execution resources the uops need to complete their operation. The fast scheduler 1002 of one embodiment can schedule on each half of the main clock cycle while the other schedulers can only schedule once per main processor clock cycle. The schedulers arbitrate for the dispatch ports to schedule uops for execution.

Register files 1008, 1010, sit between the schedulers 1002, 1004, 1006, and the execution units 1012, 1014, 1016, 1018, 1020, 1022, 1024 in the execution block 1011. In one embodiment there are a separate register files 1008, 1010, for integer and floating point operations, respectively. In one embodiment each register file 1008, 1010 includes a bypass network that can bypass or forward completed results that have not yet been written into the register file to new dependent uops. The integer register file 1008 and the floating point register file 1010 are also capable of communicating data with the other. For one embodiment, the integer register file 1008 is split into two separate register files, one register file for the low order 32 bits of data and a second register file for the high order 32 bits of data. In one embodiment the floating point register file 1010 has 128 bit wide entries.

The execution block 1011 contains the execution units 1012, 1014, 1016, 1018, 1020, 1022, 1024 to execute instructions. The register files 1008, 1010 store the integer and floating point data operand values that the microinstructions need to execute. The processor core 1000 of one embodiment is comprised of a number of execution units: address generation unit (AGU) 1012, AGU 1014, fast ALU 1016, fast ALU 1018, slow ALU 1020, floating point ALU 1022, floating point move unit 1024. For one embodiment, the floating point execution blocks 1022, 1024, execute floating point, MMX, SIMD, and SSE, or other operations. The floating point ALU 1022 of one embodiment includes a 64 bit by 64 bit floating point divider to execute divide, square root, and remainder micro-ops.

In one embodiment, instructions involving a floating point value may be handled with the floating point hardware. The ALU operations go to the high-speed ALU execution units 1016, 1018. The fast ALUs 1016, 1018, of one embodiment can execute fast operations with an effective latency of half a clock cycle. For one embodiment, most complex integer operations go to the slow ALU 1020 as the slow ALU 1020 includes integer execution hardware for long latency type of operations, such as a multiplier, shifts, flag logic, and branch processing. Memory load/store operations are executed by the AGUs 1012, 1014. For one embodiment, the integer ALUs 1016, 1018, 1020, are described in the context of performing integer operations on 64 bit data operands. In alternative embodiments, the ALUs 1016, 1018, 1020, can be implemented to support a variety of data bits including 16, 32, 128, 256, etc. Similarly, the floating point units 1022, 1024, can be implemented to support a range of operands having bits of various widths. For one embodiment, the floating point units 1022, 1024, can operate on 128 bits wide packed data operands in conjunction with SIMD and multimedia instructions.

In one embodiment, the uops schedulers 1002, 1004, 1006, dispatch dependent operations before the parent load has finished executing. As uops are speculatively scheduled and executed, the processor core 1000 also includes logic to handle memory misses. If a data load misses in the data cache, there can be dependent operations in flight in the pipeline that have left the scheduler with temporarily incorrect data. A replay mechanism tracks and re-executes instructions that use incorrect data. In one embodiment only the dependent operations need to be replayed and the independent ones are allowed to complete.

In one embodiment a memory execution unit (MEI) 1041 is included. The MEU 1041 includes a memory order buffer (MOB) 1042, an SRAM unit 1030, a data TLB unit 1072, a data cache unit 1074, and an L2 cache unit 1076.

The processor core 1000 may be configured for simultaneous multithreaded operation by sharing or partitioning various components. Any thread operating on the processor may access shared components. For example, space in a shared buffer or shared cache can be allocated to thread operations without regard to the requesting thread. In one embodiment, partitioned components are allocated per thread. Specifically which components are shared and which components are partitioned varies according to embodiments. In one embodiment, processor execution resources such as execution units (e.g., execution block 1011) and data caches (e.g., data TLB unit 1072, data cache unit 1074) are shared resources. In one embodiment multi-level caches including the L2 cache unit 1076 and other higher level cache units (e.g., L3 cache, L4 cache) are shared among all executing threads. Other processor resources are portioned and assigned or allocated on a per-thread basis, with specific partitions of the partitioned resources dedicated to specific threads. Exemplary partitioned resources include the MOB 1042, the register alias table (RAT) and reorder buffer (ROB) of the out of order engine 1003 (e.g., within the rename/allocator unit 152 and retirement unit 154 of FIG. 1B), and one or more instruction decode queues associated with the instruction decoder 1028 of the front end 1001. In one embodiment, the instruction TLB (e.g., instruction TLB unit 136 of FIG. 1B) and branch prediction unit (e.g., branch prediction unit 132 of FIG. 1B) are also partitioned.

The Advanced Configuration and Power Interface (ACPI) specification describes a power management policy that includes various "C states" that may be supported by processors and/or chipsets. For this policy, C0 is defined as the Run Time state in which the processor operates at high voltage and high frequency. C1 is defined as the Auto HALT state in which the core clock is stopped internally. C2 is defined as the Stop Clock state in which the core clock is stopped externally. C3 is defined as a Deep Sleep state in which all processor clocks are shut down, and C4 is defined as a Deeper Sleep state in which all processor clocks are stopped and the processor voltage is reduced to a lower data retention point. Various additional deeper sleep power states, C5 and C6 are also implemented in some processors. During the C6 state, all threads are stopped, thread state is stored in a C6 SRAM that remains powered during the C6 state, and voltage to the processor core is reduced to zero.

Figure 11:
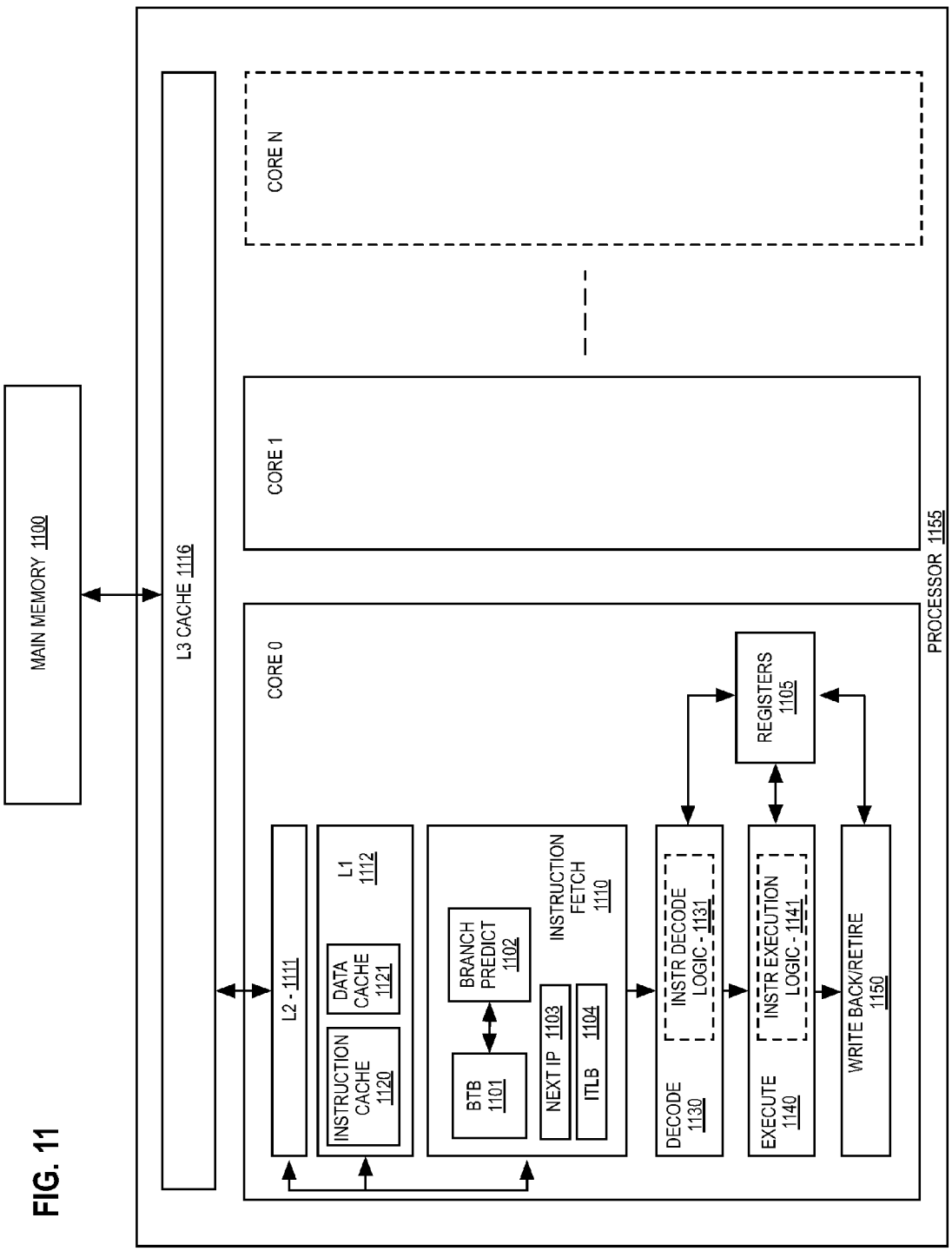
FIG. 11 is a block diagram of a processing system including logic to perform a centrifuge operation according to an embodiment.

FIG. 11 is a block diagram of a processing system including logic to perform a centrifuge operation according to an embodiment. The exemplary processing system includes a processor 1155 coupled to main memory 1100. The processor 1155 includes a decode unit 1130 with decode logic 1131 for decoding the centrifuge instructions. Additionally, a processor execution engine unit 1140 includes additional execution logic 1141 for executing the centrifuge instructions. Registers 1105 provide register storage for operands, control data and other types of data as the execution unit 1140 executes the instruction stream.

The details of a single processor core ("Core 0") are illustrated in FIG. 11 for simplicity. It will be understood, however, that each core shown in FIG. 11 may have the same set of logic as Core 0. As illustrated, each core may also include a dedicated Level 1 (L1) cache 1112 and Level 2 (L2) cache 1111 for caching instructions and data according to a specified cache management policy. The L1 cache 1111 includes a separate instruction cache 1320 for storing instructions and a separate data cache 1121 for storing data. The instructions and data stored within the various processor caches are managed at the granularity of cache lines, which may be a fixed size (e.g., 64, 128, 512 Bytes in length). Each core of this exemplary embodiment has an instruction fetch unit 1110 for fetching instructions from main memory 1100 and/or a shared Level 3 (L3) cache 1116; a decode unit 1130 for decoding the instructions; an execution unit 1340 for executing the instructions; and a write back/retire unit 1150 for retiring the instructions and writing back the results.

The instruction fetch unit 1110 includes various well known components including a next instruction pointer 1103 for storing the address of the next instruction to be fetched from memory 1100 (or one of the caches); an instruction translation look-aside buffer (ITLB) 1104 for storing a map of recently used virtual-to-physical instruction addresses to improve the speed of address translation; a branch prediction unit 1102 for speculatively predicting instruction branch addresses; and branch target buffers (BTBs) 1101 for storing branch addresses and target addresses. Once fetched, instructions are then streamed to the remaining stages of the instruction pipeline including the decode unit 1130, the execution unit 1140, and the write back/retire unit 1150.

Figure 12:
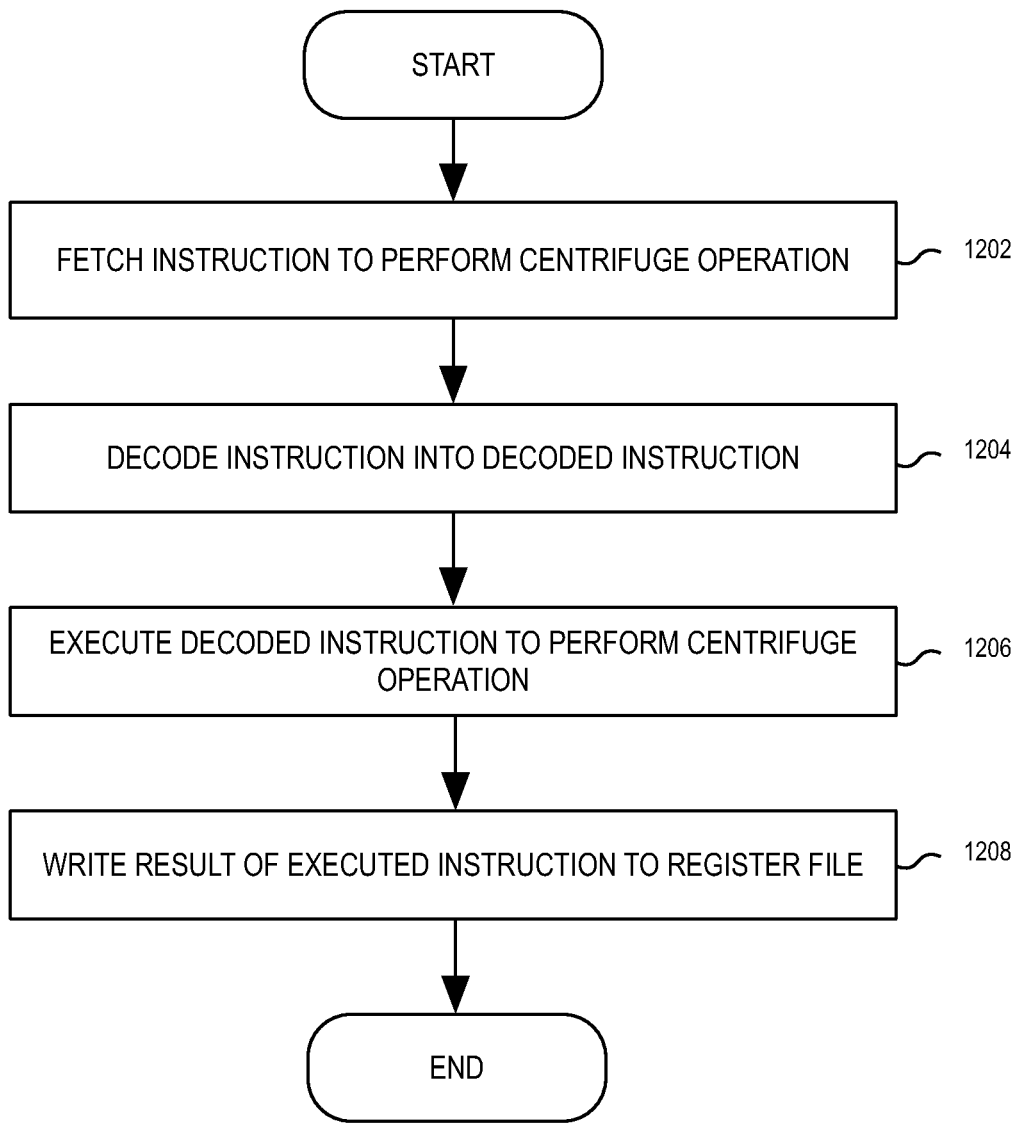
FIG. 12 is a flow diagram for logic to process an exemplary centrifuge instruction, according to an embodiment.

FIG. 12 is a flow diagram for logic to process an exemplary centrifuge instruction, according to an embodiment, At block 1202, the instruction pipeline beings with a fetch of an instruction to perform a centrifuge operation. In some embodiments the instruction accepts a first input operand, a second input operand, and a destination operand. In such embodiments, the input operands include a control mask and a source register. The source register may be a general-purpose register or a vector register storing packed byte, word, double word, or quad word values. The control mask may be provided in a general purpose register that is used to control the separation of bits from a source general-purpose register or for each element of a source vector register. In one embodiment the control mask may be provided via vector register to control bit separation from a source vector register. In one embodiment, the destination operand provides a destination register, which may be a general-purpose register or a vector register configured to store packed byte, word, double word or quad word values.

At block 1204, a decode unit decodes the instruction into a decoded instruction. In one embodiment, the decoded instruction is a single operation. In one embodiment the decoded instruction includes one or more logical micro-operations to perform each sub-element of the instruction. The micro-operations can be hard-wired or microcode operations can cause components of the processor, such as an execution unit, to perform various operations to implement the instruction.

At block 1206 an execution unit of the processor executes the decoded instruction to perform a centrifuge (e.g., sheep and goats) operation that separates bits from a source register into opposing sides of a destination register or data element of a vector register based on a control mask. Exemplary logic operations to perform a centrifuge operation are shown in FIGS. 9A-E, although the specific operations performed may vary according to embodiments, and alternative or additional logic may be used to perform the centrifuge operation. During execution, one or more execution units of the processor read bits of source data from the source register or source register vector element and write the bits to one side or an opposing side of a destination register based on the control mask. In one embodiment, a control mask bit of one indicates that a value is to be written to the 'right' side of a register, while a control mask bit of zero indicates that a value is to be written to the 'left' side of the register. According to embodiments, the 'right' and 'left' side of the register may respectively indicate the low order and high order bits of the register. As described herein, the high and low order bits are defined as the most significant and least significant bits independent of the convention used to interpret the bytes making up a data word when those bytes are stored in computer memory. However, as byte order may vary according to embodiments and configurations, it will be understood that the byte order associated with the respective register sides and word addresses/offsets may differ without violating the scope of the various embodiments.

At block 1408 the processor writes the result of the executed instruction to the processor register file. The processor register file includes one or more physical register files that store various data types, including scalar integer or packed integer data types. In one embodiment the register file includes the general purpose or vector register indicated as the destination register by the instruction destination operand.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 13A:
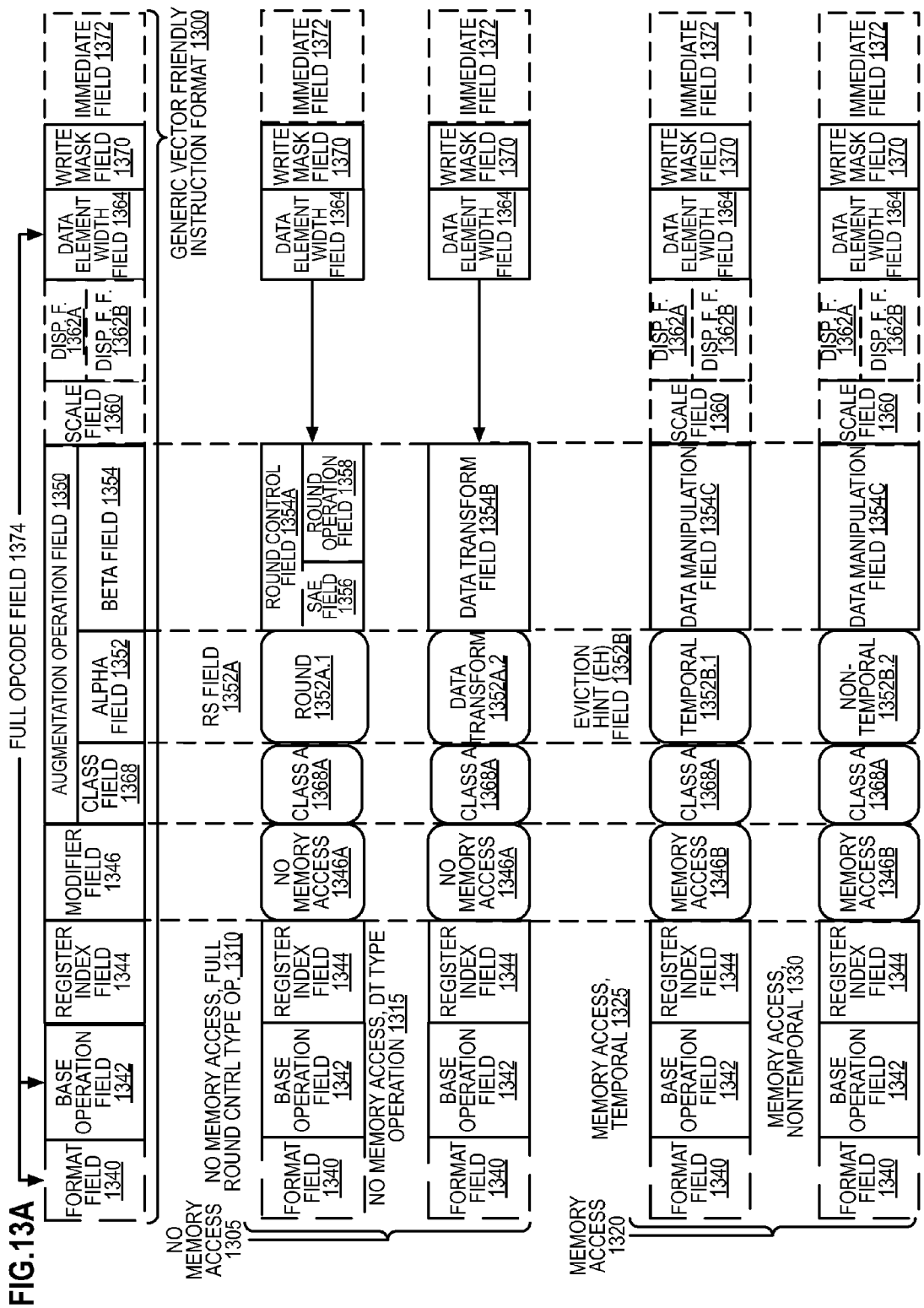
FIGS. 13A-B are block diagrams illustrating a generic vector friendly instruction format and instruction templates thereof according to embodiments.
Figure 13B:
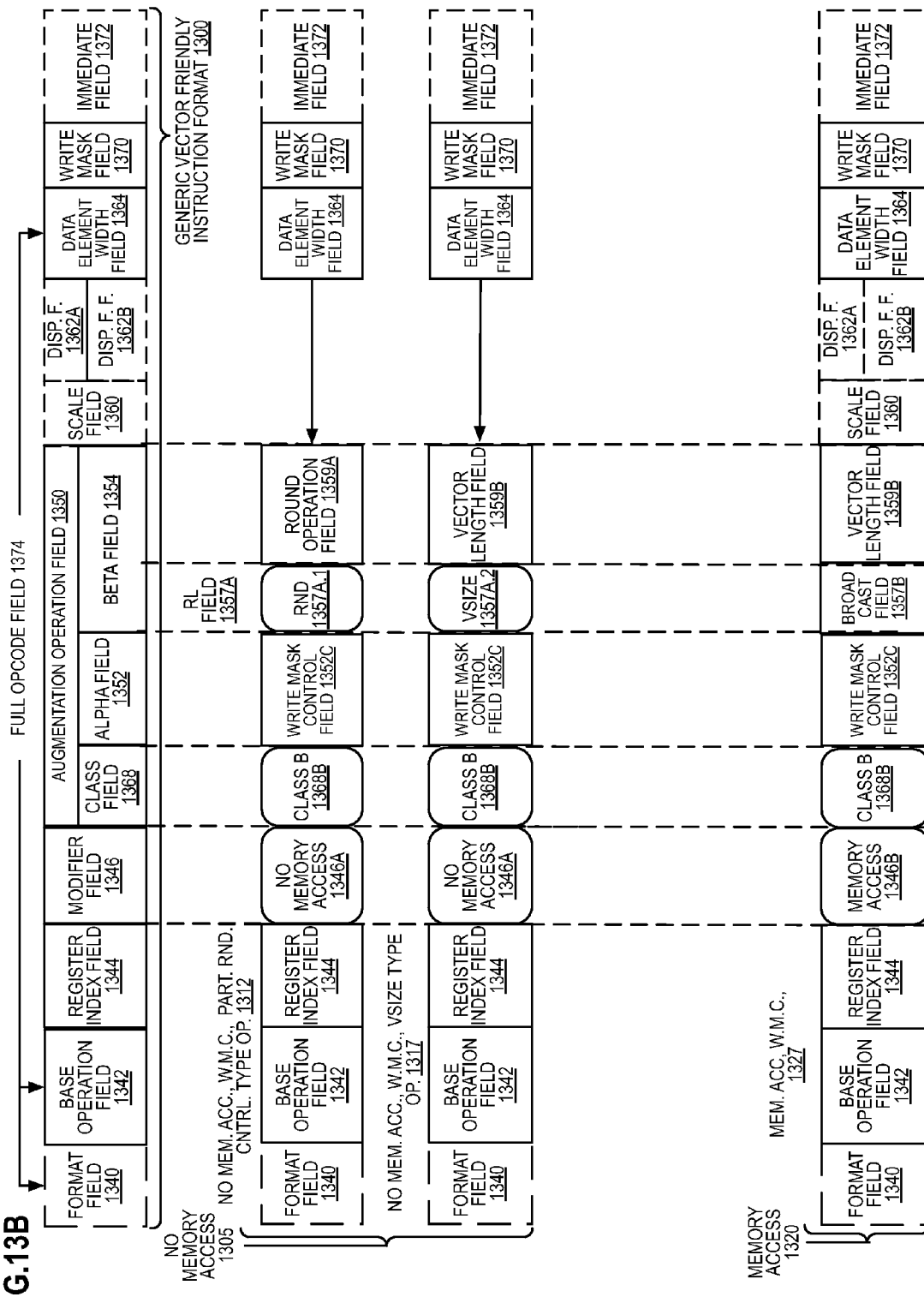

FIGS. 13A-13B are block diagrams illustrating a generic vector friendly instruction format and instruction templates thereof according to an embodiment. FIG. 13A is a block diagram illustrating a generic vector friendly instruction format and class A instruction templates thereof according to an embodiment; while FIG. 13B is a block diagram illustrating the generic vector friendly instruction format and class B instruction templates thereof according to an embodiment. Specifically, a generic vector friendly instruction format 1300 for which are defined class A and class B instruction templates, both of which include no memory access 1305 instruction templates and memory access 1320 instruction templates. The term generic in the context of the vector friendly instruction format refers to the instruction format not being tied to any specific instruction set.

Embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes). However, alternate embodiments support more, less and/or different vector operand sizes (e.g., 256 byte vector operands) with more, less, or different data element widths (e.g., 128 bit (16 byte) data element widths).

The class A instruction templates in FIG. 13A include: 1) within the no memory access 1305 instruction templates there is shown a no memory access, full round control type operation 1310 instruction template and a no memory access, data transform type operation 1315 instruction template; and 2) within the memory access 1320 instruction templates there is shown a memory access, temporal 1325 instruction template and a memory access, non-temporal 1330 instruction template. The class B instruction templates in FIG. 13B include: 1) within the no memory access 1305 instruction templates there is shown a no memory access, write mask control, partial round control type operation 1312 instruction template and a no memory access, write mask control, vsize type operation 1317 instruction template; and 2) within the memory access 1320 instruction templates there is shown a memory access, write mask control 1327 instruction template.

The generic vector friendly instruction format 1300 includes the following fields listed below in the order illustrated in FIGS. 13A-13B.

Format field 1340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1342—its content distinguishes different base operations.

Register index field 1344—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1346—its content distinguishes occurrences of instructions in the generic vector instruction format that specify memory access from those that do not; that is, between no memory access 1305 instruction templates and memory access 1320 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1350—its content distinguishes which one of a variety of different operations to be performed in addition to the base operation. This field is context specific. In one embodiment, this field is divided into a class field 1368, an alpha field 1352, and a beta field 1354. The augmentation operation field 1350 allows common groups of operations to be performed in a single instruction rather than 2, 3, or 4 instructions.

Scale field 1360—its content allows for the scaling of the index field's content for memory address generation (e.g., for address generation that uses $2^{scale}*\text{index}+\text{base}$).

Displacement Field 1362A—its content is used as part of memory address generation (e.g., for address generation that uses $2^{scale}*\text{index}+\text{base}+\text{displacement}$).

Displacement Factor Field 1362B (note that the juxtaposition of displacement field 1362A directly over displacement factor field 1362B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1374 (described later herein) and the data manipulation field 1354C. The displacement field 1362A and the displacement factor field 1362B are optional in the sense that they are not used for the no memory access 1305 instruction templates and/or different embodiments may implement only one or none of the two.

Data element width field 1364—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1370—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1370 allows for partial vector operations, including loads, stores, arithmetic, logical, etc. While embodiments are described in which the write mask field's 1370 content selects one of a number of write mask registers that contains the write mask to be used (and thus the write mask field's 1370 content indirectly identifies that masking to be performed), alternative embodiments instead or additional allow the mask write field's 1370 content to directly specify the masking to be performed.

Immediate field 1372—its content allows for the specification of an immediate. This field is optional in the sense that is it not present in an implementation of the generic vector friendly format that does not support immediate and it is not present in instructions that do not use an immediate.

Class field 1368—its content distinguishes between different classes of instructions. With reference to FIGS. 13A-B, the contents of this field select between class A and class B instructions. In FIGS. 13A-B, rounded corner squares are used to indicate a specific value is present in a field (e.g., class A 1368A and class B 1368B for the class field 1368 respectively in FIGS. 13A-B).

Instruction Templates of Class A

In the case of the non-memory access 1305 instruction templates of class A, the alpha field 1352 is interpreted as an RS field 1352A, whose content distinguishes which one of the different augmentation operation types are to be performed (e.g., round 1352A.1 and data transform 1352A.2 are respectively specified for the no memory access, round type operation 1310 and the no memory access, data transform type operation 1315 instruction templates), while the beta field 1354 distinguishes which of the operations of the specified type is to be performed. In the no memory access 1305 instruction templates, the scale field 1360, the displacement field 1362A, and the displacement scale filed 1362B are not present.

No-Memory Access Instruction Templates—Full Round Control Type Operation

In the no memory access full round control type operation 1310 instruction template, the beta field 1354 is interpreted as a round control field 1354A, whose content(s) provide static rounding. While in the described embodiments the round control field 1354A includes a suppress all floating point exceptions (SAE) field 1356 and a round operation control field 1358, alternative embodiments may support may encode both these concepts into the same field or only have one or the other of these concepts/fields (e.g., may have only the round operation control field 1358).

SAE field 1356—its content distinguishes whether or not to disable the exception event reporting; when the SAE field's 1356 content indicates suppression is enabled, a given instruction does not report any kind of floating-point exception flag and does not raise any floating point exception handler.

Round operation control field 1358—its content distinguishes which one of a group of rounding operations to perform (e.g., Round-up, Round-down, Round-towards-zero and Round-to-nearest). Thus, the round operation control field 1358 allows for the changing of the rounding mode on a per instruction basis. In one embodiment a processor includes a control register for specifying rounding modes and the round operation control field's 1350 content overrides that register value.

No Memory Access Instruction Templates—Data Transform Type Operation

In the no memory access data transform type operation 1315 instruction template, the beta field 1354 is interpreted as a data transform field 1354B, whose content distinguishes which one of a number of data transforms is to be performed (e.g., no data transform, swizzle, broadcast).

In the case of a memory access 1320 instruction template of class A, the alpha field 1352 is interpreted as an eviction hint field 1352B, whose content distinguishes which one of the eviction hints is to be used (in FIG. 13A, temporal 1352B.1 and non-temporal 1352B.2 are respectively specified for the memory access, temporal 1325 instruction template and the memory access, non-temporal 1330 instruction template), while the beta field 1354 is interpreted as a data manipulation field 1354C, whose content distinguishes which one of a number of data manipulation operations (also known as primitives) is to be performed (e.g., no manipulation; broadcast; up conversion of a source; and down conversion of a destination). The memory access 1320 instruction templates include the scale field 1360, and optionally the displacement field 1362A or the displacement scale field 1362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1352 is interpreted as a write mask control (Z) field 1352C, whose content distinguishes whether the write masking controlled by the write mask field 1370 should be a merging or a zeroing.

In the case of the non-memory access 1305 instruction templates of class B, part of the beta field 1354 is interpreted as an RL field 1357A, whose content distinguishes which one of the different augmentation operation types are to be performed (e.g., round 1357A.1 and vector length (VSIZE) 1357A.2 are respectively specified for the no memory access, write mask control, partial round control type operation 1312 instruction template and the no memory access, write mask control, VSIZE type operation 1317 instruction template), while the rest of the beta field 1354 distinguishes which of the operations of the specified type is to be performed. In the no memory access 1305 instruction templates, the scale field 1360, the displacement field 1362A, and the displacement scale filed 1362B are not present.

In the no memory access, write mask control, partial round control type operation 1310 instruction template, the rest of the beta field 1354 is interpreted as a round operation field 1359A and exception event reporting is disabled (a given instruction does not report any kind of floating-point exception flag and does not raise any floating point exception handler).

Round operation control field 1359A—just as round operation control field 1358, its content distinguishes which one of a group of rounding operations to perform (e.g., Round-up, Round-down, Round-towards-zero and Round-to-nearest). Thus, the round operation control field 1359A allows for the changing of the rounding mode on a per instruction basis. In one embodiment a processor includes a control register for specifying rounding modes and the round operation control field's 1350 content overrides that register value.

In the no memory access, write mask control, VSIZE type operation 1317 instruction template, the rest of the beta field 1354 is interpreted as a vector length field 1359B, whose content distinguishes which one of a number of data vector lengths is to be performed on (e.g., 128, 256, or 512 byte).

In the case of a memory access 1320 instruction template of class B, part of the beta field 1354 is interpreted as a broadcast field 1357B, whose content distinguishes whether or not the broadcast type data manipulation operation is to be performed, while the rest of the beta field 1354 is interpreted the vector length field 1359B. The memory access 1320 instruction templates include the scale field 1360, and optionally the displacement field 1362A or the displacement scale field 1362B.

With regard to the generic vector friendly instruction format 1300, a full opcode field 1374 is shown including the format field 1340, the base operation field 1342, and the data element width field 1364. While one embodiment is shown where the full opcode field 1374 includes all of these fields, the full opcode field 1374 includes less than all of these fields in embodiments that do not support all of them. The full opcode field 1374 provides the operation code (opcode).

The augmentation operation field 1350, the data element width field 1364, and the write mask field 1370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 14 is a block diagram illustrating an exemplary specific vector friendly instruction format according to an embodiment. FIG. 14 shows a specific vector friendly instruction format 1400 that is specific in the sense that it specifies the location, size, interpretation, and order of the fields, as well as values for some of those fields. The specific vector friendly instruction format 1400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 13 into which the fields from FIG. 14 map are illustrated.

It should be understood that, although embodiments are described with reference to the specific vector friendly instruction format 1400 in the context of the generic vector friendly instruction format 1300 for illustrative purposes, the invention is not limited to the specific vector friendly instruction format 1400 except where claimed. For example, the generic vector friendly instruction format 1300 contemplates a variety of possible sizes for the various fields, while the specific vector friendly instruction format 1400 is shown as having fields of specific sizes. By way of specific example, while the data element width field 1364 is illustrated as a one bit field in the specific vector friendly instruction format 1400, the invention is not so limited (that is, the generic vector friendly instruction format 1300 contemplates other sizes of the data element width field 1364).

The generic vector friendly instruction format 1300 includes the following fields listed below in the order illustrated in FIG. 14A.

EVEX Prefix (Bytes 0-3) 1402—is encoded in a four-byte form.

Format Field 1340 (EVEX Byte 0, bits [7:0])—the first byte (EVEX Byte 0) is the format field 1340 and it contains 0x62 (the unique value used for distinguishing the vector friendly instruction format in one embodiment of the invention).

The second-fourth bytes (EVEX Bytes 1-3) include a number of bit fields providing specific capability.

REX field 1405 (EVEX Byte 1, bits [7-5])—consists of a EVEX.R bit field (EVEX Byte 1, bit [7]—R), EVEX.X bit field (EVEX byte 1, bit [6]—X), and 1357BEX byte 1, bit[5]—B). The EVEX.R, EVEX.X, and EVEX.B bit fields provide the same functionality as the corresponding VEX bit fields, and are encoded using 1 s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the first part of the REX' field 1310 and is the EVEX.R' bit field (EVEX Byte 1, bit [4]—R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1415 (EVEX byte 1, bits [3:0]—mmmm)—its content encodes an implied leading opcode byte (0F, 0F 38, or 0F 3).

Data element width field 1364 (EVEX byte 2, bit [7]—W)—is represented by the notation EVEX.W. EVEX.W is used to define the granularity (size) of the datatype (either 32-bit data elements or 64-bit data elements).

EVEX.vvvv 1420 (EVEX Byte 2, bits [6:3]—vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1420 encodes the 4 low-order bits of the first source register specifier stored in inverted (1 s complement) form. Depending on the instruction, an extra different EVEX bit field is used to extend the specifier size to 32 registers.

EVEX.U 1368 Class field (EVEX byte 2, bit [2]—U)—If EVEX.U=0, it indicates class A or EVEX.U0; if EVEX.U=1, it indicates class B or EVEX.U1.

Prefix encoding field 1425 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1352 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1354 (EVEX byte 3, bits [6:4]—SSS, also known as EVEX.$s_{2-0}$, EVEX.$r_{2-0}$,EVEX.rr1, EVEX.LL0, EVEX.LLB; also illustrated with βββ)—as previously described, this field is context specific.

REX' field 1310—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1370 (EVEX byte 3, bits [2:0]—kkk)— its content specifies the index of a register in the write mask registers as previously described. In one embodiment, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1430 (Byte 4) is also known as the opcode byte. Part of the opcode is specified in this field.

MOD R/M Field 1440 (Byte 5) includes MOD field 1442, Reg field 1444, and R/M field 1446. As previously described, the MOD field's 1442 content distinguishes between memory access and non-memory access operations. The role of Reg field 1444 can be summarized to two situations: encoding either the destination register operand or a source register operand, or be treated as an opcode extension and not used to encode any instruction operand. The role of R/M field 1446 may include the following: encoding the instruction operand that references a memory address, or encoding either the destination register operand or a source register operand.

Scale, Index, Base (SIB) Byte (Byte 6)—As previously described, the scale field's 1350 content is used for memory address generation. SIB.xxx 1454 and SIB.bbb 1456—the contents of these fields have been previously referred to with regard to the register indexes Xxxx and Bbbb.

Displacement field 1362A (Bytes 7-10)—when MOD field 1442 contains 10, bytes 7-10 are the displacement field 1362A, and it works the same as the legacy 32-bit displacement (disp32) and works at byte granularity.

Displacement factor field 1362B (Byte 7)—when MOD field 1442 contains 01, byte 7 is the displacement factor field 1362B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1362B is a reinterpretation of disp8; when using displacement factor field 1362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1362B substitutes the legacy x86 instruction set 8-bit displacement. Thus, the displacement factor field 1362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1372 operates as previously described.

Full Opcode Field

FIG. 14B is a block diagram illustrating the fields of the specific vector friendly instruction format 1400 that make up the full opcode field 1374 according to one embodiment. Specifically, the full opcode field 1374 includes the format field 1340, the base operation field 1342, and the data element width (W) field 1364. The base operation field 1342 includes the prefix encoding field 1425, the opcode map field 1415, and the real opcode field 1430.

Register Index Field

FIG. 14C is a block diagram illustrating the fields of the specific vector friendly instruction format 1400 that make up the register index field 1344 according to one embodiment. Specifically, the register index field 1344 includes the REX field 1405, the REX' field 1410, the MODR/M.reg field 1444, the MODR/M.r/m field 1446, the VVVV field 1420, xxx field 1454, and the bbb field 1456.

Augmentation Operation Field

Figure 14D:
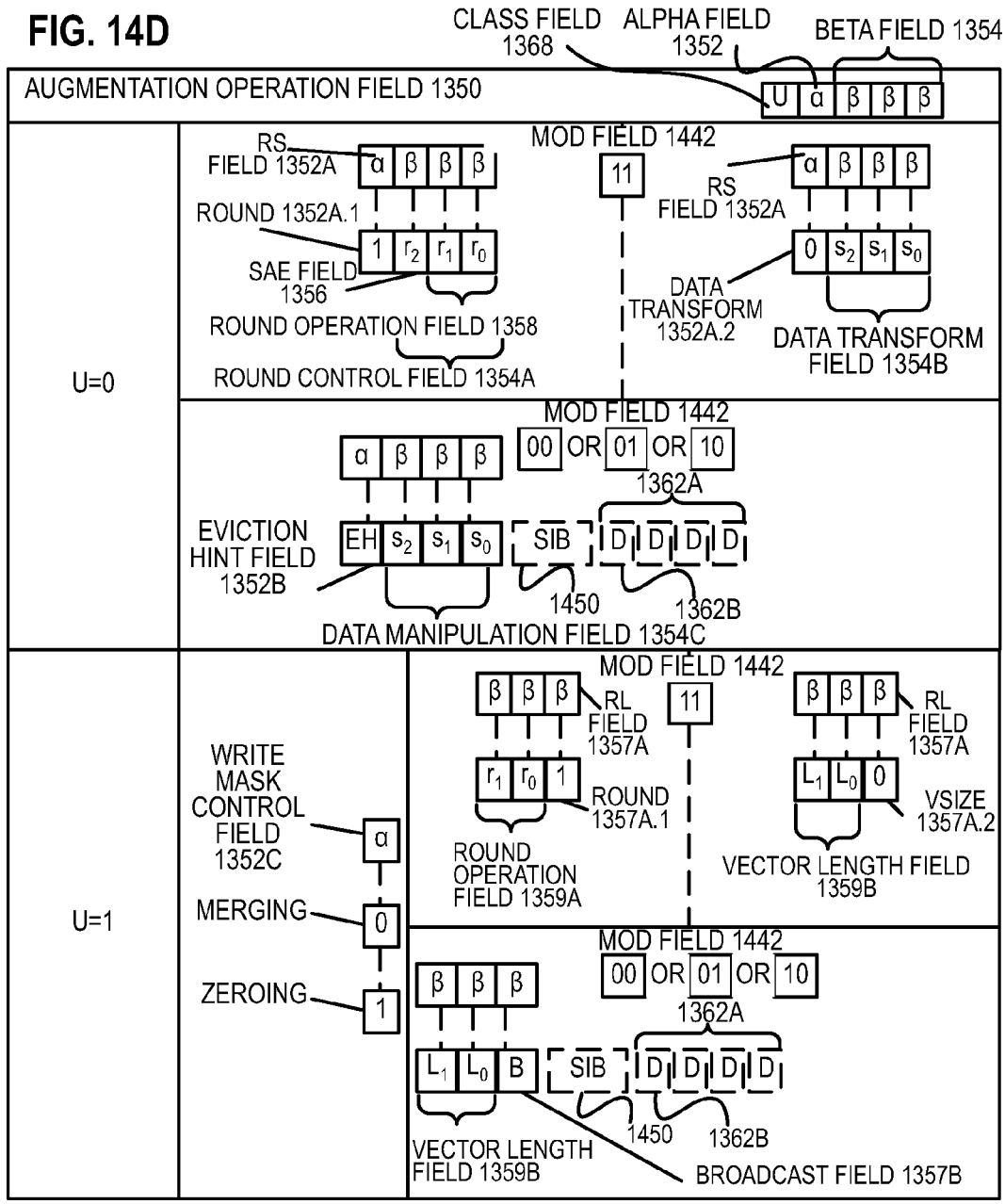

FIG. 14D is a block diagram illustrating the fields of the specific vector friendly instruction format 1400 that make up the augmentation operation field 1350 according to one embodiment. When the class (U) field 1368 contains 0, it signifies EVEX.U0 (class A 1368A); when it contains 1, it signifies EVEX.U1 (class B 1368B). When U=0 and the MOD field 1442 contains 11 (signifying a no memory access operation), the alpha field 1352 (EVEX byte 3, bit [7]—EH) is interpreted as the rs field 1352A. When the rs field 1352A contains a 1 (round 1352A.1), the beta field 1354 (EVEX byte 3, bits [6:4]—SSS) is interpreted as the round control field 1354A. The round control field 1354A includes a one bit SAE field 1356 and a two bit round operation field 1358. When the rs field 1352A contains a 0 (data transform 1352A.2), the beta field 1354 (EVEX byte 3, bits [6:4]—SSS) is interpreted as a three bit data transform field 1354B. When U=0 and the MOD field 1442 contains 00, 01, or 10 (signifying a memory access operation), the alpha field 1352 (EVEX byte 3, bit [7]—EH) is interpreted as the eviction hint (EH) field 1352B and the beta field 1354 (EVEX byte 3, bits [6:4]—SSS) is interpreted as a three bit data manipulation field 1354C.

When U=1, the alpha field 1352 (EVEX byte 3, bit [7]—EH) is interpreted as the write mask control (Z) field 1352C. When U=1 and the MOD field 1442 contains 11 (signifying a no memory access operation), part of the beta field 1354 (EVEX byte 3, bit [4]—$S_0$) is interpreted as the RL field 1357A; when it contains a 1 (round 1357A.1) the rest of the beta field 1354 (EVEX byte 3, bit [6-5]—$S_{2-1}$) is interpreted as the round operation field 1359A, while when the RL field 1357A contains a 0 (VSIZE 1357.A2) the rest of the beta field 1354 (EVEX byte 3, bit [6-5]—$S_{2-1}$) is interpreted as the vector length field 1359B (EVEX byte 3, bit [6-5]—$L_{1-0}$). When U=1 and the MOD field 1442 contains 00, 01, or 10 (signifying a memory access operation), the beta field 1354 (EVEX byte 3, bits [6:4]—SSS) is interpreted as the vector length field 1359B (EVEX byte 3, bit [6-5]—$L_{1-0}$) and the broadcast field 1357B (EVEX byte 3, bit [4]—B).

Exemplary Register Architecture

Figure 15:
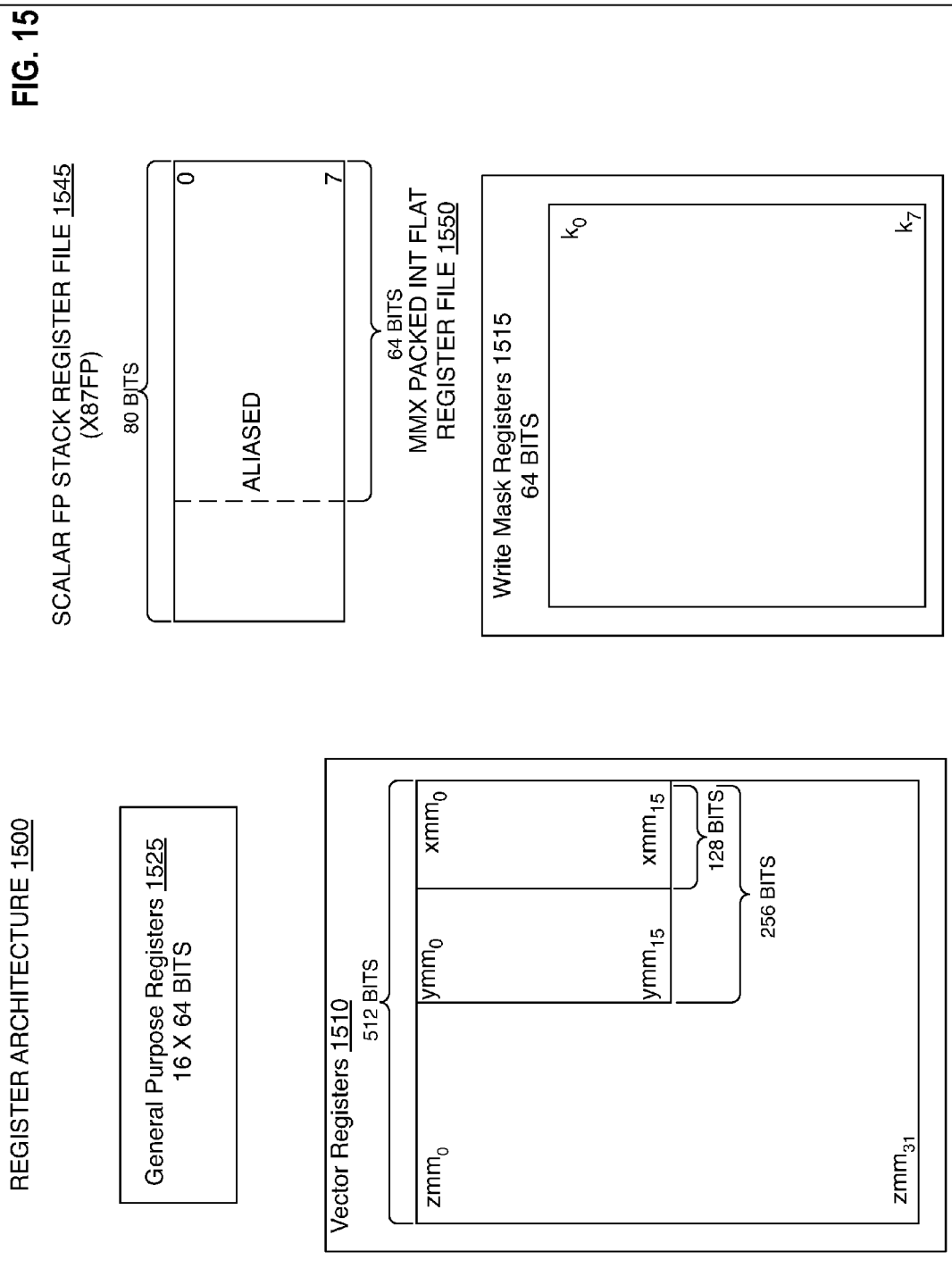
FIG. 15 is a block diagram of scalar and vector register architecture according to an embodiment.

FIG. 15 is a block diagram of a register architecture 1500 according to one embodiment. In the embodiment illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1400 operates on these overlaid registers as illustrated in Table 3 below.

TABLE 3

Register File

| Adjustable Vector Length | Class | Operations | Registers |
|---|---|---|---|
| Instruction Templates that do not include the vector length field 1359B | A (FIG. 13A; U = 0) | 1310, 1315, 1325, 1330 | zmm registers (the vector length is 64 byte) |
| | B (FIG. 13B; U = 1) | 1312 | zmm registers (the vector length is 64 byte) |
| Instruction Templates that do include the vector length field 1359B | B (FIG. 13B; U = 1) | 1317, 1327 | zmm, ymm, or xmm registers (the vector length is 64 byte, 32 byte, or 16 byte) depending on the vector length field 1359B |

In other words, the vector length field 1359B selects between a maximum length and one or more other shorter lengths, where each such shorter length is half the length of the preceding length; and instructions templates without the vector length field 1359B operate on the maximum vector length. Further, in one embodiment, the class B instruction templates of the specific vector friendly instruction format 1400 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in one embodiment the vector mask register k0 cannot be used as a write mask; when the encoding that would normally indicate k0 is used for a write mask, it selects a hardwired write mask of 0xFFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Described herein is system of one or more computers that can be configured to perform particular operations or actions by virtue of having software, firmware, hardware, or a combination thereof installed on the system to cause the system to perform actions. Additionally, one or more computer programs can be configured to perform particular operations or actions by virtue of including instructions or hardware logic that, when executed or utilized by a processing apparatus, cause the apparatus to perform the actions described herein. In one embodiment the processing apparatus includes decode logic to decode a first instruction into a decoded first instruction including a first operand and a second operand. The processing apparatus additionally includes an execution unit to execute the first decoded instruction to perform a centrifuge operation.

The centrifuge operation is to separate bits from a source register specified by the second operand based on a control mask indicated by the first operand. In one embodiment the second operand specifies the source register insofar as it names an architectural register, which may be a general purpose or vector register storing source data or source data elements. The first operand indicates the control mask insofar as it lists a architectural register, or, in one embodiment, may directly indicate a control mask value as an immediate operand, or may include a memory address that includes a control mask. Other embodiments include corresponding computer systems, apparatus, and computer programs recorded on one or more computer storage devices, each configured to perform action specified herein.

For example, one embodiment the processing apparatus further includes an instruction fetch unit to fetch the first instruction, where the instruction is a single machine-level instruction. In one embodiment the processing apparatus further includes a register file to commit a result of the centrifuge operation described herein to a location specified by a destination operand, which may be a general purpose or vector register. The register file unit can be configured to store a set of physical registers including a first register to store a first source operand value, a second register to store a second source operand value, and a third register to store at least one data element of the result of the aforementioned centrifuge operation.

In one embodiment the first register is to store the control mask, where the control mask includes multiple bits, where each bit of the control mask to indicate a bit position in a destination register to write a value from the source register to read a value. In one embodiment a control mask bit of one indicates that a value is to be written to a first region of the third register, while a control mask bit of zero indicates that a value is to be written to a second region of the third register.

In one embodiment the first region of the third register includes low byte-order bits of the register and the second region of the third register includes high byte-order bits of the register. In one embodiment, the lower byte-order bits of the first region are classified as the 'right' side of the register, while the high byte-order bits of the second region are classified as the 'left' side of the register. It will be understood, however, that the centrifuge operation can be configured to operate on opposing sides of a register, or multiple vector elements in the case of a vector register, without limit as to byte order or address convention associated with the register.

In one embodiment the instructions described herein refer to specific configurations of hardware, such as application specific integrated circuits (ASICs), configured to perform certain operations or having a predetermined functionality. Such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

In the foregoing specification, the invention has been described with reference to specific exemplary embodiments thereof. It will, however, be evident that various modifications and changes may be made thereto without departing from the broader spirit and scope of the invention as set forth in the appended claims. In certain instances, well-known structures and functions were not described in elaborate detail in order to avoid obscuring the subject matter of the present invention. The specification and drawings are, accordingly, to be regarded in an illustrative rather than a restrictive sense. Accordingly, the scope and spirit of the invention should be judged in terms of the claims that follow.

What is claimed is:

1. A processing apparatus comprising:
    decode circuitry to decode a instruction into a decoded instruction including a first operand and a second operand; and
    an execution unit to execute the decoded instruction to perform a centrifuge operation that separates bits from a source register specified by the second operand based on a control mask indicated by the first operand by:
        extracting bits from the source register to a first temporary register based on the control mask,
        performing a NOT operation to negate bits from the control mask to create a negative control mask,
        extracting bits from the source register to a second temporary register based on the negative control mask,
        shifting left bits from the second temporary register, and
        performing an OR operation to combine the first and second temporary registers.

2. The processing apparatus as in claim 1 further comprising an instruction fetch unit to fetch the instruction, wherein the instruction is a single machine-level instruction.

3. The processing apparatus as in claim 1 further comprising a register file unit to commit a result of the centrifuge operation to a location specified by a destination operand.

4. The processing apparatus as in claim 3 wherein the register file unit is further to store a set of registers comprising:
    a first register to store a first source operand value;
    a second register to store a second source operand value; and
    a third register to store at least one data element of the result of the centrifuge operation.

5. The processing apparatus as in claim 4 wherein the first register is to store the control mask.

6. The processing apparatus as in claim 5 wherein the control mask includes multiple bits, wherein each bit of the control mask is to indicate a position within the third register to write a value from the second register.

7. The processing apparatus as in claim 6 wherein a control mask bit of one indicates that the value from the second register is to be written to a first region in the third register and a control mask bit of zero indicates that the value is to be written to a second region in the third register.

8. The processing apparatus as in claim 7 wherein the first region of the third register includes low byte-order bits, the second region of the third register includes high byte-order bits, and the first and second region are in opposition.

9. The processing apparatus as in claim 4 wherein the first or second register is a general-purpose register.

10. The processing apparatus as in claim 9 wherein the general-purpose register is a 64-bit register.

11. The processing apparatus as in claim 4 wherein the first or second register is a vector register.

12. The processing apparatus as in claim 11 wherein the vector register is a 512-bit register to store packed data elements.

13. The processing apparatus as in claim 11 wherein the vector register is a 256-bit register to store packed data elements.

14. The processing apparatus as in claim 11 wherein the vector register is a 128-bit register to store packed data elements.

15. The processing apparatus as in claim 14 wherein the packed data elements include a byte, word, double word, or quad word data element and the centrifuge operation to separate bits in each data element.

16. A non-transitory machine-readable medium having stored thereon data, which if performed by at least one machine, causes the at least one machine to fabricate at least one integrated circuit to perform operations including:
    fetching a single instruction to perform a centrifuge operation, the instruction having two source operands and a destination operand;
    decoding the single instruction into a decoded instruction;
    fetching source operand values associated with at least one operand; and
    executing the decoded instruction to separate bits from opposing regions of a source register specified by a second source operand based on a control mask indicated by a first source operand by:
        extracting bits from the source register to a first temporary register based on the control mask, performing a NOT operation to negate bits from the control mask to create a negative control mask, extracting bits from the source register to a second temporary register based on the negative control mask, shifting left bits from the second temporary register, and performing an OR operation to combine the first and second temporary registers.

17. The medium as in claim 16 wherein the integrated circuit to perform further operations including committing a result of the centrifuge operation to a location indicated by the destination operand.

18. The medium as in claim 17 wherein executing the decoded instruction includes performing at least one parallel extract operation to extract a field of bits from an arbitrary position in a source register and write the field to a contiguous region in a destination register.

19. The medium as in claim 18 wherein the destination register is a temporary register.

20. The medium as in claim 19 further comprising performing multiple parallel extract operations to multiple temporary registers, performing an OR operation on the multiple temporary registers, and committing the result to the location indicated by the destination operand.

* * * * *